US009916123B2

(12) United States Patent
Natori

(10) Patent No.: US 9,916,123 B2
(45) Date of Patent: Mar. 13, 2018

(54) INFORMATION PROCESSING APPARATUS, INFORMATION PROCESSING SYSTEM, INFORMATION PROCESSING METHOD, AND COMPUTER READABLE RECORDING MEDIUM FOR DISPLAYING IMAGES FROM MULTIPLE TERMINAL DEVICES AT DIFFERENT SIZES IN A LIST

(71) Applicant: Seiko Epson Corporation, Tokyo (JP)

(72) Inventor: Takashi Natori, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 134 days.

(21) Appl. No.: 14/943,257

(22) Filed: Nov. 17, 2015

(65) Prior Publication Data

US 2016/0140690 A1    May 19, 2016

(30) Foreign Application Priority Data

Nov. 19, 2014   (JP) ................. 2014-234867

(51) Int. Cl.
*G09G 5/00* (2006.01)
*G06T 3/40* (2006.01)
(Continued)

(52) U.S. Cl.
CPC ............ *G06F 3/147* (2013.01); *G06F 3/0425* (2013.01); *G06F 3/1415* (2013.01);
(Continued)

(58) Field of Classification Search
CPC .... G06F 3/1454; G06F 9/54; G06F 2209/541; G06F 3/1462; G06F 3/1415; H04N 7/15; H04N 1/00347; H04N 1/00453; H04N 1/42; H04N 21/43637; H04N 21/4788; H04N 21/482; H04N 21/8153; G09G 2340/00
(Continued)

(56) References Cited

U.S. PATENT DOCUMENTS

2007/0257927 A1* 11/2007 Sakanishi .............. G09G 5/005
345/581
2008/0282195 A1* 11/2008 Nakagawa .......... G06F 17/3028
715/838
(Continued)

FOREIGN PATENT DOCUMENTS

JP          2008-305420 A     12/2008

*Primary Examiner* — Jin-Cheng Wang
(74) *Attorney, Agent, or Firm* — ALG Intellectual Property, LLC

(57) ABSTRACT

An information processing apparatus includes a first acquisition section that acquires image data from each of terminal devices, the image data representing an image displayed on the terminal device, a display control section that displays, based on the acquired image data, a list of the images displayed on the terminal devices, a second acquisition section that acquires from one terminal device of the terminal devices a signal notifying that the image displayed on the one terminal device has been updated, a determination section that determines, in accordance with an acquisition order of the signal from the one terminal device among the terminal devices, the size of the image displayed on the one terminal device when the image is displayed in the list, and an update section that updates the list in accordance with the determined size.

15 Claims, 16 Drawing Sheets

(51) Int. Cl.

| | | |
|---|---|---|
| *G06F 13/00* | (2006.01) | |
| *G06F 3/048* | (2013.01) | |
| *G06F 3/147* | (2006.01) | |
| *G06F 3/14* | (2006.01) | |
| *H04N 7/15* | (2006.01) | |
| *H04N 21/4788* | (2011.01) | |
| *H04N 21/482* | (2011.01) | |
| *H04N 1/00* | (2006.01) | |
| *H04N 21/4363* | (2011.01) | |
| *H04N 1/42* | (2006.01) | |
| *G06F 3/042* | (2006.01) | |

(52) U.S. Cl.
CPC .......... *G06F 3/1431* (2013.01); *G06F 3/1462* (2013.01); *H04N 1/00347* (2013.01); *H04N 1/00453* (2013.01); *H04N 1/42* (2013.01); *H04N 7/15* (2013.01); *H04N 21/43637* (2013.01); *H04N 21/4788* (2013.01); *H04N 21/482* (2013.01); *G09G 2340/00* (2013.01)

(58) Field of Classification Search
USPC ...... 345/173, 667, 1.1, 619, 581; 348/14.09, 348/E7.083; 715/753, 838, 765
See application file for complete search history.

(56) References Cited

U.S. PATENT DOCUMENTS

| | | | | |
|---|---|---|---|---|
| 2011/0025819 | A1* | 2/2011 | Gorzynski | H04N 7/15 348/14.07 |
| 2011/0057884 | A1* | 3/2011 | Gormish | G06F 9/54 345/173 |
| 2012/0284635 | A1* | 11/2012 | Sitrick | G06Q 10/101 715/751 |
| 2013/0019188 | A1* | 1/2013 | Hasegawa | H04N 7/15 715/753 |
| 2013/0242036 | A1* | 9/2013 | Gorzynski | H04N 5/23238 348/14.09 |
| 2014/0272888 | A1* | 9/2014 | Waxman | G09B 5/02 434/350 |
| 2014/0282090 | A1* | 9/2014 | Waxman | H04L 65/403 715/753 |

* cited by examiner

FIG. 11A  J=1

| I2 | I3 | I4 | I5 | I6 |
| I7 | I8 | I9 | I10 | I11 | I12 |
| I13 | I14 | I15 | I16 | I17 | I18 |
| I19 | I20 | I21 | I22 | I23 | I24 |
| I25 | I26 | I27 | I28 | I29 | I30 |

FIG. 11B  J=2

| | I3 | I4 | I5 | I6 |
| I7 | I8 | I9 | I10 | I11 | I12 |
| I13 | I14 | I15 | I16 | I17 | I18 |
| I19 | I20 | I21 | I22 | I23 | I24 |
| I25 | I26 | I27 | I28 | I29 | I30 |

FIG. 11C  J=12

| I13 | I14 | I15 | I16 | I17 |
| I18 | I19 | I20 | I21 | I22 |
| I23 | I24 | I25 | I26 | I27 |
| I28 | I29 | I30 | | |

FIG. 11D  J=21

| I22 | I23 | I24 |
| I25 | I26 | I27 |
| I28 | I29 | I30 |

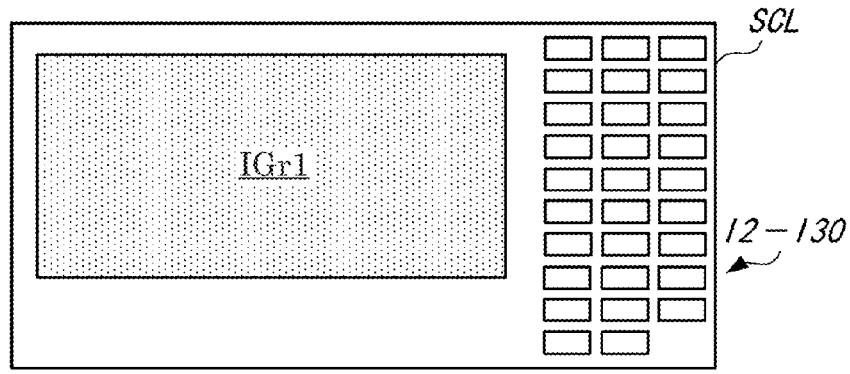
FIG.16A  J=1
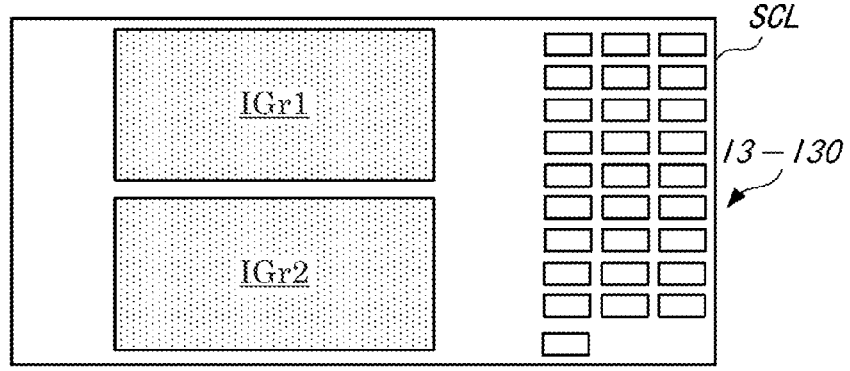
FIG.16B  J=2
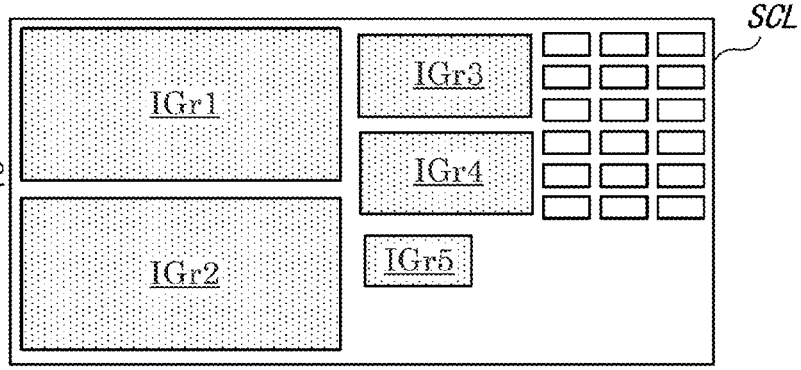
FIG.16C  J=12
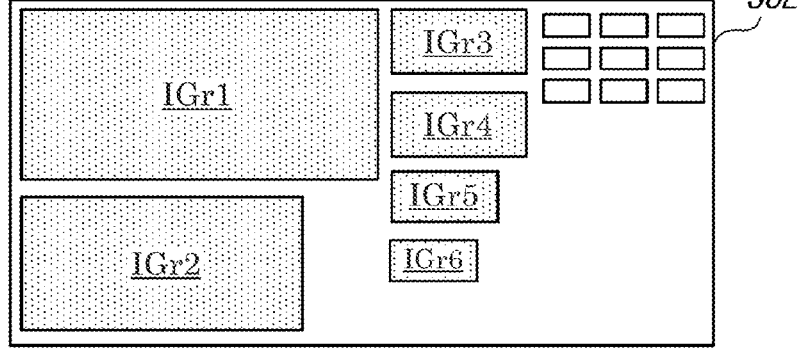
FIG.16D  J=21

INFORMATION PROCESSING APPARATUS, INFORMATION PROCESSING SYSTEM, INFORMATION PROCESSING METHOD, AND COMPUTER READABLE RECORDING MEDIUM FOR DISPLAYING IMAGES FROM MULTIPLE TERMINAL DEVICES AT DIFFERENT SIZES IN A LIST

The entire disclosure of Japanese Patent Application No. 2014-234867, filed Nov. 19, 2014, is expressly incorporated by reference herein.

BACKGROUND

1. Technical Field

The present invention relates to a technology for displaying a list of images displayed on a plurality of terminal devices.

2. Related Art

There is a known system of related art for monitoring the situation of use of a plurality of terminal devices connected over a network and allowing an administrator to observe a result of the monitoring. For example, JP-A-2008-305420 describes that an administrative server acquires an operation log in a communication terminal and displays (for example, enlarges and displays) an operation screen image on the communication terminal on a monitor when the administrative server determines that an important file has been deleted or any other risky operation has been performed.

In a system that monitors screen images displayed in a plurality of terminal devices, a list of the screen images displayed on the terminal devices is displayed in a single screen image. In the system, when a large number of terminal devices are monitored, a display area provided per terminal device is small, and the screen image on each of the terminal devices displayed in the list is therefore not readily observable in some cases. It is therefore in some cases difficult to visually grasp whether or not the screen image displayed on each of the terminal devices has changed and what has been changed in the screen image.

SUMMARY

An advantage of some aspects of the invention is to display a list of images displayed on a plurality of terminal devices and readily allow visual grasp of a change in the image displayed on each of the terminal devices.

An information processing apparatus according to an aspect of the invention is an information processing apparatus that communicates with a plurality of terminal devices each of which displays an image and includes a first acquisition section that acquires image data from each of the plurality of terminal devices, the image data representing an image displayed on the terminal device, a display control section that displays, based on the acquired image data, a list of the images displayed on the plurality of terminal devices, a second acquisition section that acquires from one terminal device of the plurality of terminal devices a signal notifying that the image displayed on the one terminal device has been updated, a determination section that determines, in accordance with an acquisition order of the signal from the one terminal device among the plurality of terminal devices, the size of the image displayed on the one terminal device when the image is displayed in the list, and an update section that updates the list in accordance with the determined size.

According to the aspect of the invention, in accordance with the acquisition order of the signals notifying that images displayed on the terminal devices have been updated, the size of each of the images displayed on the terminal devices is determined when the image is displayed in a list. Therefore, when the images displayed on the plurality of terminal devices are displayed in the list, a change in the image displayed on each of the terminal devices can be readily visually grasped.

In the aspect of the invention, the determination section may increase the size by a greater amount when the order is earlier.

According to the aspect of the invention with the configuration described above, an updated image on any of the terminal devices can be readily visually grasped.

In the aspect of the invention, the update section may delete the image displayed on the one terminal device from the list.

According to the aspect of the invention with the configuration described above, the situation of a terminal device that has not notified the information process apparatus of update of the image displayed thereon can be readily visually grasped.

In the aspect of the invention, the determination section may decrease the size by a greater amount when the order is earlier.

According to the aspect of the invention with the configuration described above, the situation of a terminal device that has not notified the information processing apparatus of update of the image displayed thereon can be readily visually grasped.

In the aspect of the invention, when the signal is not acquired, the update section may repeatedly acquire image data representing the image displayed on the one terminal device and display an image represented by the acquired image data in the list.

According to the aspect of the invention with the configuration described above, an image displayed on a terminal device that has not notified the information processing apparatus of update of the image displayed thereon can, for example, be displayed in realtime.

In the aspect of the invention, after the list is displayed, the second acquisition section may acquire from one terminal device of the plurality of terminal devices a signal notifying that the image displayed on the one terminal device has been updated.

According to the aspect of the invention with the configuration described above, since the update notification is acquired after the list is displayed, a change in the size is readily recognized.

An information processing apparatus according to another aspect of the invention is an information processing apparatus that communicates with a plurality of terminal devices each of which displays an image and includes a first acquisition section that acquires first image data from each of the plurality of terminal devices, the first image data representing an image displayed on the terminal device, a display control section that displays, based on the acquired first image data, a list of the images displayed on the plurality of terminal devices, a second acquisition section that acquires from one terminal device of the plurality of terminal devices second image data representing the image displayed on the one terminal device, a determination section that determines, in accordance with the acquired second image data, the size of the image displayed on the one terminal device when the image is displayed in the list, and an update section that updates the list in accordance with the determined size.

According to the aspect of the invention, in accordance with an image displayed on a terminal device, the size of the image displayed in a list is determined. Therefore, when the images displayed on the plurality of terminal devices are displayed in the list, a change in the image displayed on each of the terminal devices can be readily visually grasped.

In the aspect of the invention, the information processing apparatus may further include an analysis section that analyzes the second image data. The update section may classify the plurality of terminal devices into a plurality of groups in accordance with a result of the analysis and displays the image represented by the second image data in the list for each of the classified groups, and the determination section may determine the size of the image represented by the second image data for each of the groups in accordance with the number of terminal devices classified into the group.

According to the aspect of the invention with the configuration described above, the images displayed on the terminal devices classified into each of the groups along with the number of terminal devices that display the images can be readily visually grasped.

In the aspect of the invention, the information processing apparatus may further include an analysis section that analyzes the second image data, and the determination section may determine the size in accordance with a result of the analysis of the second image data.

According to the aspect of the invention with the configuration described above, whether a result of the analysis of an image displayed on a terminal device after the list is displayed satisfies a predetermined condition can be readily visually grasped.

In the aspect of the invention, after the list is displayed, the second acquisition section may acquire from one terminal device of the plurality of terminal devices the second image data representing the image displayed on the one terminal device.

According to the aspect of the invention with the configuration described above, since the second image data is acquired after the list is displayed, a change in the size is readily recognized.

The invention can be considered as an information processing system, an information processing method, and a program as well as the information processing apparatus.

BRIEF DESCRIPTION OF THE DRAWINGS

The invention will be described with reference to the accompanying drawings, wherein like numbers reference like elements.

FIGS. 11A to 11D describe the display of the list screen image in the case where the deletion mode is selected in the information processing apparatus according to the first embodiment.

FIGS. 16A to 16D describe the display of a list screen image in the case where the grouping mode is selected in the information processing apparatus according to the second embodiment.

DESCRIPTION OF EXEMPLARY EMBODIMENTS

Embodiments of the invention will be described below with reference to the drawings.

First Embodiment

Figure 1:
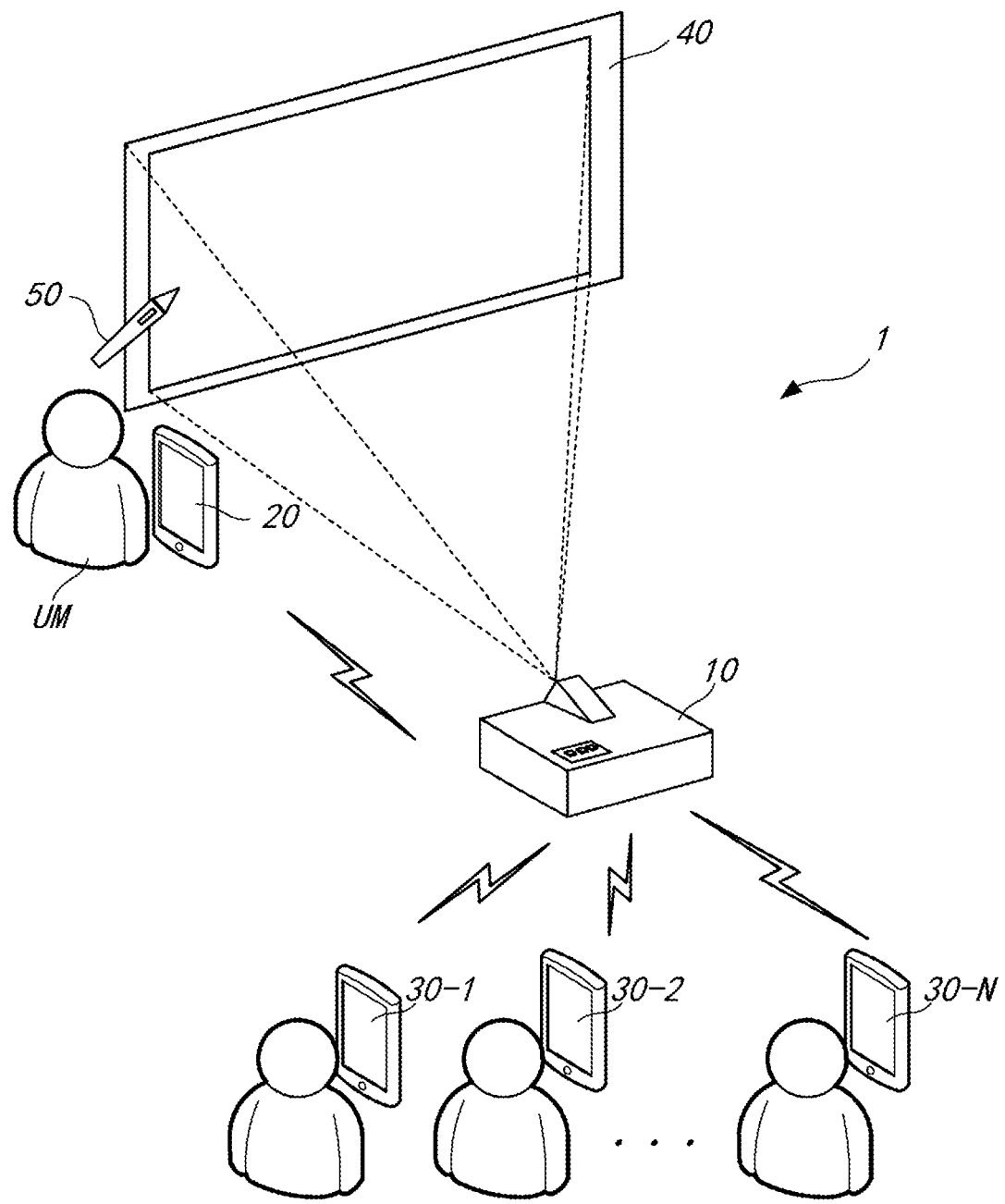
FIG. 1 shows an overall configuration of an information processing system according to a first embodiment of the invention.

FIG. 1 shows an overall configuration of an information processing system 1 according to a first embodiment of the invention. The information processing system 1 includes a projector 10, an information processing apparatus 20, and a plurality of display terminals 30 (30-1, 30-2, ..., 30-N (N is a natural number)).

The projector 10 is, for example, a liquid crystal projector and a projection-type display apparatus that projects an image on a screen 40. The projector 10 projects, for example, a color image on the screen 40 based on image signals corresponding to R (red), G (green), and B (blue) three primary color components. The screen 40 is a reflective screen in the embodiment and a projection surface on which the projector 10 projects an image.

The information processing apparatus 20 is connected to the projector 10 based on wireless communication, distributes data used for screen image display to the projector 10 and the display terminals 30, and displays a list screen image showing a list of images displayed on the display terminals 30 (that is, display screen images). A user who uses the information processing apparatus 20 is hereinafter referred to as a "user UM." The user UM is, for example, a teacher who gives a class in a school.

Each of the display terminals 30 is a terminal device connected to the projector 10 based on wireless communication. Each of the display terminals 30 receives the data distributed by the information processing apparatus 20 via the projector 10 and transmits image data representing a display screen image on the terminal device to the information processing apparatus 20 via the projector 10. Users who use the display terminals 30-1, 30-2, . . . , 30-N are, for example, pupils who attend the class in the school.

The projector 10, the information processing apparatus 20, and the display terminals 30-1 to 30-N may not be wirelessly connected to each other and may instead be wired to each other, that is, a specific communication method is not necessarily employed. Further, the information processing apparatus 20 and the display terminals 30-1 to 30-N only need to transmit and receive data to and from the other over a network, that is, are not necessarily be connected to each other via the projector 10.

A pointer 50 is a pen-shaped device (operation device) in the embodiment and points a position on the screen 40. The user UM uses the pointer 50 to handwrite a character or a figure and select a menu displayed on the screen 40. The pointer 50 is not limited to a pen-shaped device and may be an operation device having a rod-like shape or any other shape. Further, the pointer 50 is not limited to an operation device and may be replaced with a hand, a finger, or any other bodily part of the user UM.

Figure 2:
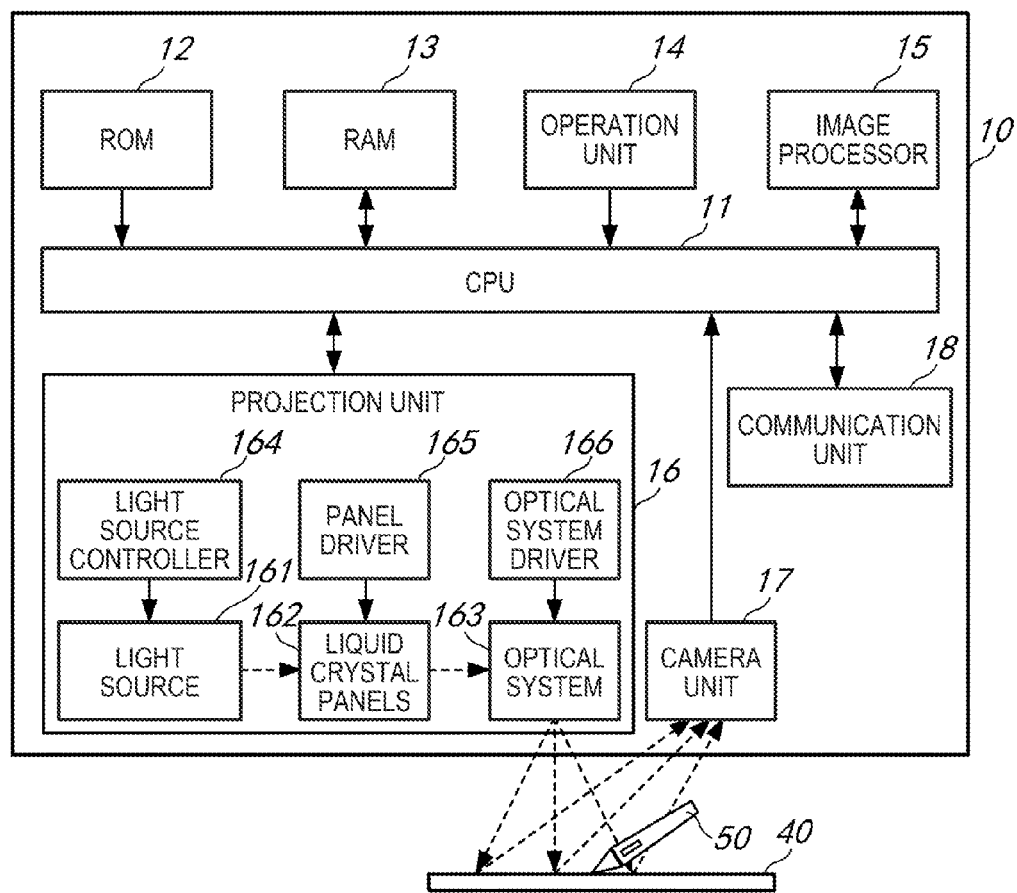
FIG. 2 is a block diagram showing the hardware configuration of a projector according to the first embodiment.

FIG. 2 is a block diagram showing the hardware configuration of the projector 10. The projector 10 includes a CPU (central processing unit) 11, a ROM (read only memory) 12, a RAM (random access memory) 13, an operation unit 14, an image processor 15, a projection unit 16, a camera unit 17, and a communication unit 18, as shown in FIG. 2.

The CPU 11 is a processor that reads a program stored in the ROM 12 or any other storage device into the RAM 13 and executes the program to control the components of the projector 10. The operation unit 14 includes operation components (physical keys, for example) for power-on/off of the projector 10 and a variety of other types of operation.

The image processor 15 includes an image processing circuit, such as an ASIC (application specific integrated circuit), and is responsible for image processing performed by the projector 10. The image processor 15 generates image signals for image projection on the screen 40 based, for example, on image information received via the communication unit 18 under the control of the CPU 11. The image processor 15 performs resizing, trapezoidal correction, and other types of image processing as well as the generation of image signals.

The projection unit 16 projects an image on the screen 40 based on image data having undergone image processing performed by the image processor 15. The projection unit 16 includes a light source 161, liquid crystal panels 162, an optical system 163, a light source controller 164, a panel driver 165, and an optical system driver 166. The light source 161 is a solid-state light source including an LED (light emitting diode), a semiconductor diode, or any other light emitting device and emits light to the liquid crystal panels 162. Each of the liquid crystal panels 162 is, for example, a transmissive liquid crystal panel and a light modulator that modulates the light incident from the light source 161. The liquid crystal panela 162 are provided in correspondence with the RGB three primary colors. The optical system 163 includes a lens, a drive circuit for lens adjustment, and other components, enlarges the light modulated by the liquid crystal panels 162 (image light), and projects the image light on the screen 40. The light source controller 164 drives the light source 161 under the control of the CPU 11. The panel driver 165 drives the liquid crystal panels 162 based on the image signals supplied from the CPU 11. The optical system driver 166 drives the drive circuit in the optical system 163 under the control of the CPU 11. Each of the light modulators may instead be a reflective liquid crystal panel or may be a digital micromirror device (DMD) or any other device.

The camera unit 17 includes an image sensor (CMOS sensor or CCD sensor, for example) and captures an image of the screen 40. In the present embodiment, the camera unit 17 captures an image of the screen 40 under the control of the CPU 11. The CPU 11 detects a position on the screen 40 pointed with the pointer 50 based on light emitted from the pointer 50 and captured with the camera unit 17.

The communication unit 18 is an interface connected to the information processing apparatus 20 and the display terminals 30-1 to 30-N for communication therewith.

The projector 10 may instead detect a position pointed with the light emitted from the pointer 50 and reflected off the screen 40, for example, by using a method based, for example, on a light curtain. The projector may still instead detect the pointed position based, for example, on pattern recognition in which the shape of the pointer 50 is recognized.

Figure 3:
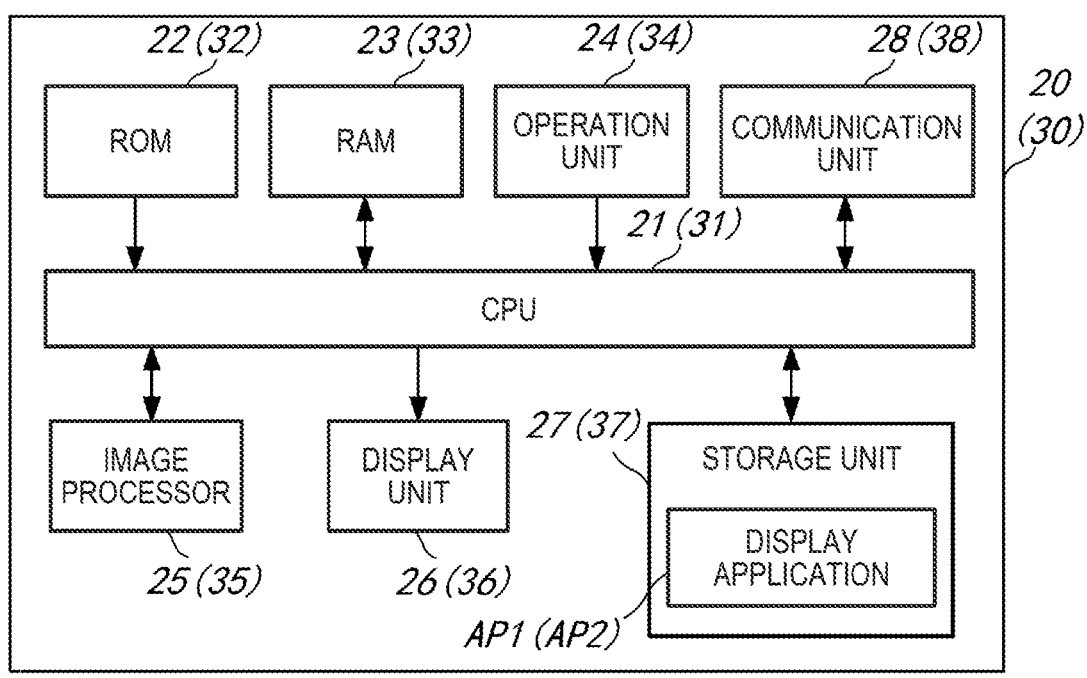
FIG. 3 is a block diagram showing the hardware configuration of each of an information processing apparatus and a display terminal according to the first embodiment.

FIG. 3 is a block diagram showing the hardware configuration of each of the information processing apparatus 20 and the display terminals 30. The information processing apparatus 20 and display terminals 30 are each a tablet-type terminal device in the present embodiment and have a common hardware configuration. In the following description, the hardware configuration of the information processing apparatus 20 will therefore be primarily described.

The information processing apparatus 20 includes a CPU 21, a ROM 22, a RAM 23, an operation unit 24, an image processor 25, a display unit 26, a storage unit 27, and a communication unit 28.

The CPU 21 is a processor that reads a program stored in the ROM 22 or the storage unit 27 into the RAM. 23 and executes the program to control the components of the information processing apparatus 20. The operation unit 24 includes a touch screen for accepting user's input operation and a plurality of operation components (physical keys, for example). The image processor 25 includes an image processing circuit, for example, an ASIC, and performs a variety of types of image processing under the control of the CPU 21.

The display unit 26 is, for example, a liquid crystal display and displays a variety of images under the control of the CPU 21. The storage unit 27 includes a storage medium, for example, a hard disk drive and stores a variety of data. The storage unit 27 stores, for example, an OS (operating system) and a display application AP1, which runs on the OS. The display application AP1 is an application program for achieving a screen image display function of the information processing apparatus 20. The communication unit 28 is an interface connected to the projector 10 for communication therewith.

Each of the display terminals 30 includes a CPU 31, a ROM 32, a RAM 33, an operation unit 34, an image processor 35, a display unit 36, a storage unit 37, and a communication unit 38. The hardware elements of each of the display terminals 30 can be described in the same manner as in the description of the hardware elements of the information processing apparatus 20 that have the same names except that the wording "information processing apparatus 20" is replaced with "display terminal 30" and the wording "CPU 21" is replaced with "CPU 31".

The storage unit 37 of each of the display terminals 30 instead stores a display application AP2. The display application AP2 is an application program for achieving a screen image display function of the display terminal 30.

Figure 4:
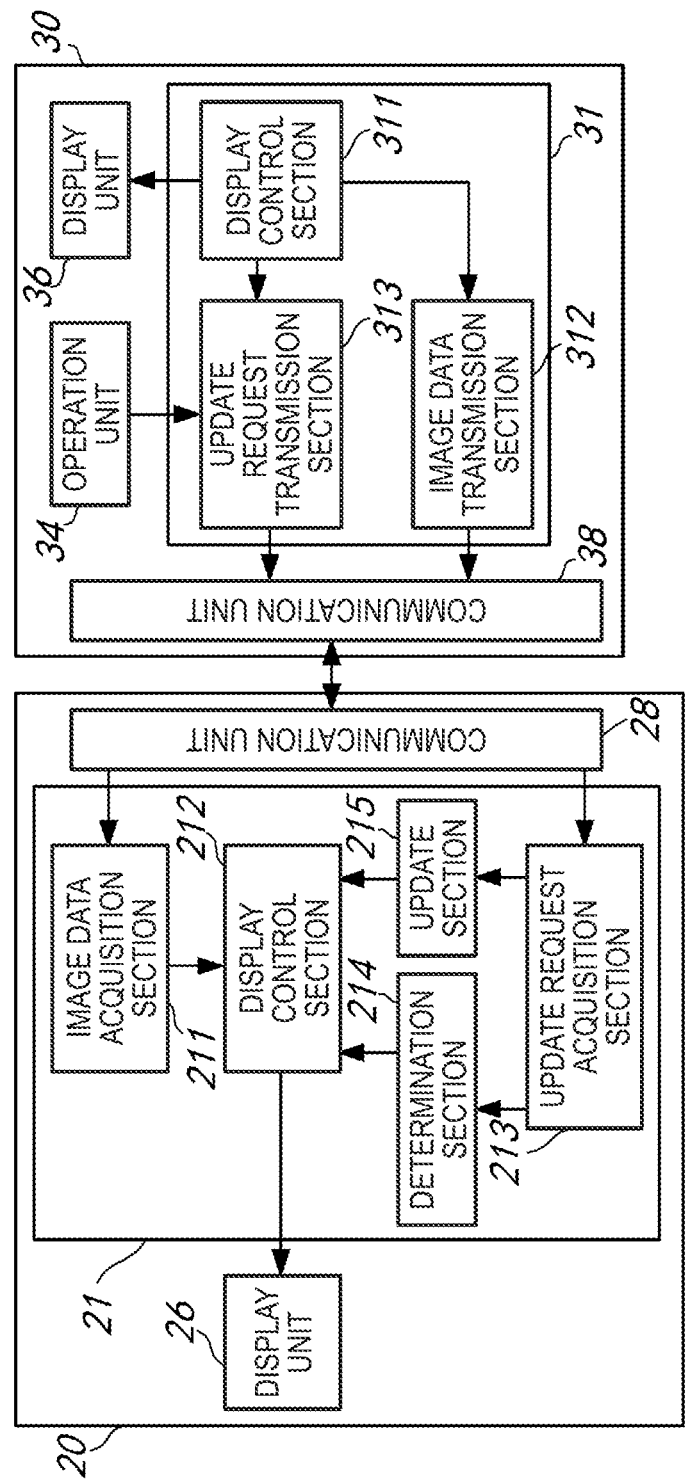
FIG. 4 is a block diagram showing the functional configuration of the information processing apparatus and the display terminal according to the first embodiment.

FIG. 4 is a block diagram showing the functional configurations of the information processing apparatus 20 and the display terminals 30. The CPU 21 of the information processing apparatus 20 executes the display application AP1 to achieve functions corresponding to an image data acquisition section 211, a display control section 212, an update request acquisition section 213, a determination section 214, and an update section 215.

The image data acquisition section 211 acquires image data representing an image displayed on each of the display terminals 30-1 to 30-N (that is, display screen image) from the display terminal 30 via the communication unit 28 (first acquisition section).

The display control section 212 displays a list screen image showing a list of the display screen images of the display terminals 30-1 to 30-N on the display unit 26 based on the image data acquired by the image data acquisition section 211. In the list screen image are disposed thumbnail images that are images expressed in thumbnails and formed of the display screen images of the display terminals 30-1 to 30-N.

After the list screen is displayed, the update request acquisition section 213 acquires, from one display terminal 30 of the display terminals 30-1 to 30-N via the communication unit 28, an update request that is a signal notifying that the image displayed on the display terminal 30 has been updated (second acquisition section). The update request includes, for example, image data representing the display screen image displayed on the display terminal 30 after the list screen image is displayed.

The determination section 214 determines, in accordance with the order of the acquisition of the update request transmitted from one display terminal 30 of the display terminals 30-1 to 30-N and acquired by the update request acquisition section 213, the size of the thumbnail image corresponding to the display terminal 30 to be displayed in the list screen image.

The update section 215 updates, in accordance with the size determined by the determination section 214, the list screen image. The update section 215 updates the thumbnail image of the display screen image on the display terminal 30 based, for example, on the image data contained in the update request.

The CPU 31 of each of the display terminals 30 executes the display application AP2 to achieve functions corresponding to a display control section 311, an image data transmission section 312, and an update request transmission section 313.

The display control section 311 controls display of an image (screen image) on the display unit 36.

The image data transmission section 312 acquires image data representing the display screen image on the display unit 36 from the display control section 311 and transmits the image data to the information processing apparatus 20 via the communication unit 38 (first transmission portion).

The update request transmission section 313 transmits the update request notifying that the display screen image on the display section 36 has been updated to the information processing apparatus 20 via the communication unit (second transmission portion). The update request transmission section 313 transmits the update request in accordance, for example, with operation performed on the operation unit 34.

Action in the present embodiment will next be described. The following description of the action will be made with reference to a case where the information processing system 1 includes 30 display terminals 30 or display terminals 30-1 to 30-30 (that is, N=30).

Overall Action

Figure 5:
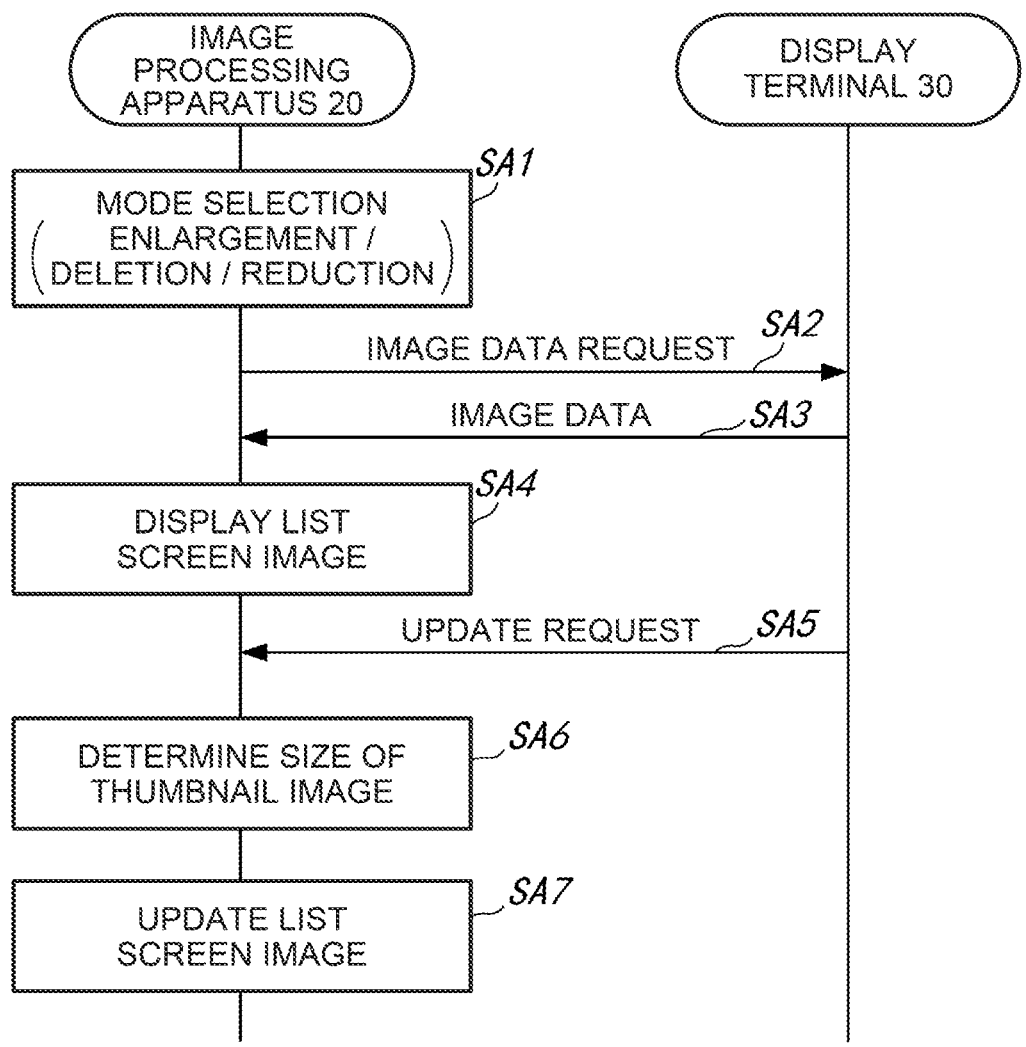
FIG. 5 is a sequence chart showing an overall process procedure in the information processing system according to the first embodiment.
Figure 6A:
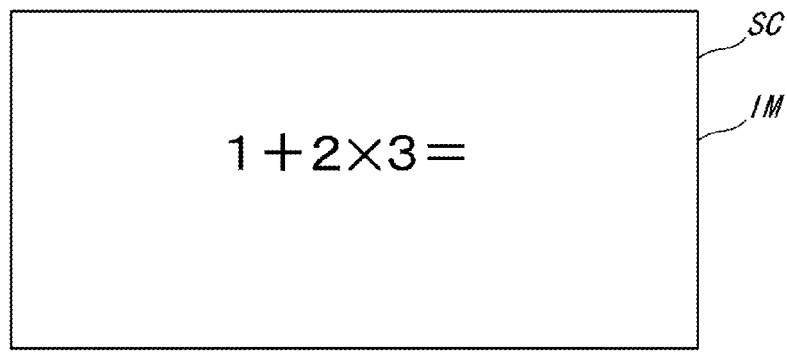
FIGS. 6A and 6B describe screen images displayed on the display terminal according to the first embodiment.
Figure 6B:
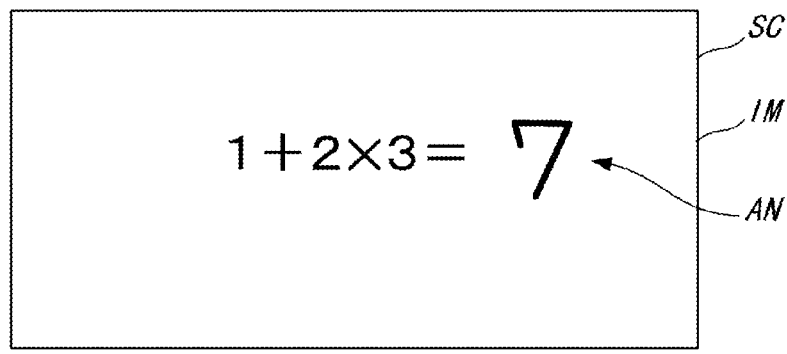
Figure 7:
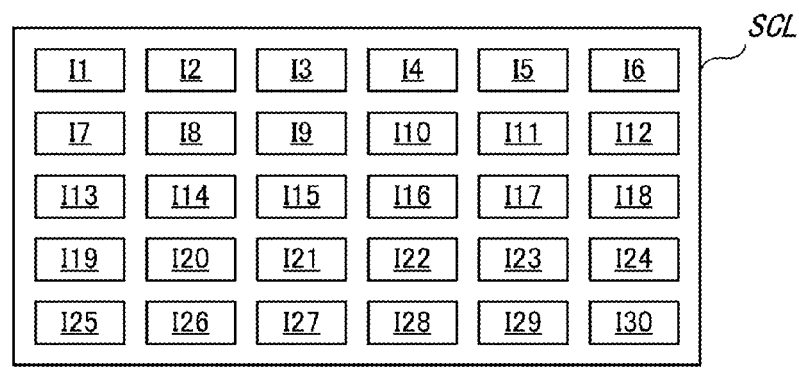
FIG. 7 describes a list screen image displayed on the information processing apparatus according to the first embodiment.

FIG. 5 is a sequence chart showing an overall process procedure in the information processing system 1. FIGS. 6A and 6B describe screen images displayed on one of the display terminals 30. FIG. 7 describes the list screen image displayed on the information processing apparatus 20.

The CPU 21 of the information processing apparatus 20 first selects a list screen image display mode (step SA1). In the present embodiment, the mode is formed of three modes, an "enlargement mode," a "deletion mode," and a "reduction mode," and each of the modes will be described later in detail. The CPU 21 then transmits an image data request that requests transmission of image data representing the current display screen image to each of the display terminals 30-1 to 30-30 via the communication unit 28 (step SA2). Having received the image data request via the communication unit 38, the CPU 31 of each of the display terminals 30, in response to the request, generates image data representing the current display screen image on the display unit 36 and transmits the image data to the information processing apparatus 20 (step SA3). The CPU 31 displays, for example, a screen image SC shown in FIG. 6A. The screen image SC contains a background image IM, which means a question sentence of "1+2×3=."

Having received image data from each of the display terminals 30-1 to 30-30 via the communication unit 28, the CPU 21 of the information processing apparatus 20 displays the list screen image on the display unit 26 based on the acquired image data (step SA4). The CPU 21 displays, for example, a list screen image SCL shown in FIG. 7 on the display unit 26. Each of the rectangles in the list screen image SCL corresponds to a thumbnail image representing the display screen image on corresponding one of the display terminals 30. In the list screen image SCL, an area for displaying a thumbnail image is allocated in correspondence with each of the display terminals 30-1 to 30-30. In the following description, a thumbnail image representing the display screen image on a display terminal 30-$i$ ($i$ is a natural number) is expressed as a "thumbnail image Ii." In the embodiment, the thumbnail image is an image produced by capturing the screen image SC described with reference to FIG. 6A and expressing the captured image in a thumbnail. In FIG. 7, the thumbnail images corresponding to the display terminals 30-1 to 30-30 have the same shape and the same dimension and are arranged in a grid.

When the CPU 31 of any of the display terminals 30 is notified that the display screen image has been updated in response to user's operation performed on the operation unit 34, the CPU 31 transmits the update request to the information processing apparatus 20 via the communication unit 38 (step SA5). The update request contains image data representing the current display screen image, for example, an image having been updated by the user. For example, consider a case where an image object AN, which means "7" that is an answer for the question sentence, is drawn on the background image IM on the screen image SC, as shown in FIG. 6B. In this case, the CPU 31 transmits an update request containing image data representing the screen image SC and the image object AN to the information processing apparatus 20. The update request, which is transmitted in response to user's operation performed on the operation unit 34, is transmitted from the display terminal 30 to the information processing apparatus 20, for example, even when no image object is drawn. In the embodiment, the image object is an image drawn by user's handwriting operation and a handwritten image representing the trajectory of positions specified on the background image. The image object is not limited to the example described above and may, for example, be an image prepared in advance and superimposed on the background image.

Having acquired (received) the update request transmitted from the display terminal 30 via the communication unit 28, the CPU 21 of the information processing apparatus 20 determines the size of the thumbnail image corresponding to the display terminal 30 (step SA6). The CPU 21 determines, in accordance with the order of the acquisition of the update request from one display terminal 30 of the display terminals 30-1 to 30-N, the size of the thumbnail image corresponding to the display terminal 30. A size determination algorithm depends on the mode selected in step SA1.

Having acquired (received) the update request from the display terminal 30 via the communication unit 28, the CPU 21 of the information processing apparatus 20 updates the list screen image (step SA7). In this process, the CPU 21 updates the list screen image in accordance with the size determined in step SA6. An update algorithm depends on the mode selected in step SA1.

The overall process procedure in the information processing system 1 common to the three modes, the "enlargement mode," the "deletion mode," and the "reduction mode," has been described. A description will subsequently made of the determination of the size of a thumbnail image and the update of the list screen image performed by the information processing apparatus 20 in each of the modes.

Enlargement Mode

Figure 8:
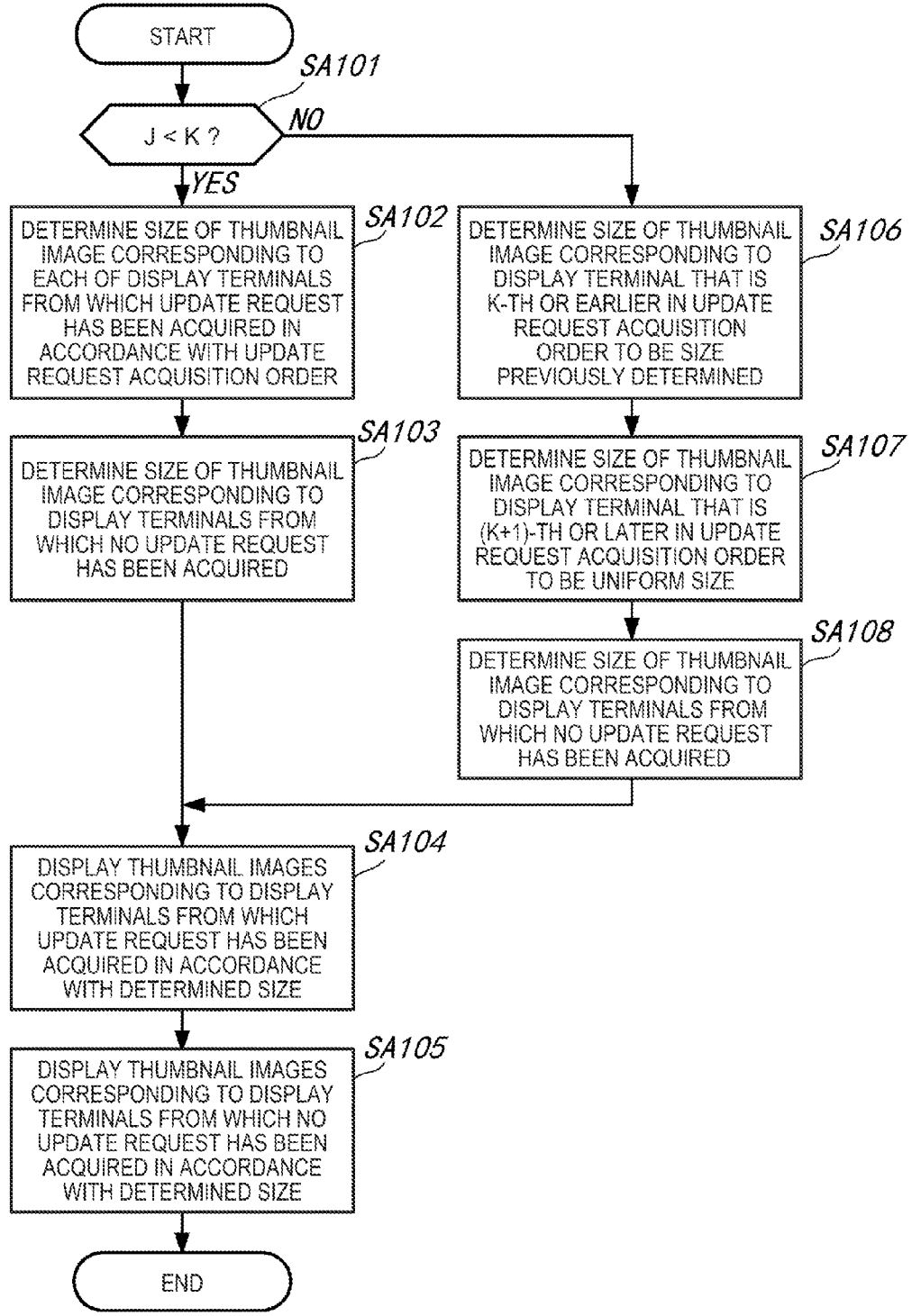
FIG. 8 is a flowchart showing processes carried out when an enlargement mode is selected in the information processing apparatus according to the first embodiment.

FIG. 8 is a flowchart showing processes carried out when the enlargement mode is selected in the information processing apparatus 20. FIGS. 9A to 9D describe the display of the list screen image in the case where the enlargement mode is selected in the information processing apparatus 20.

The CPU 21 first evaluates whether or not the number J of display terminals 30 from which the update request has been acquired is smaller than a specified number K determined in advance (step SA101). The specified number K is 6 in the embodiment. When J=1, the CPU 21 provides a result of the evaluation "YES" in step SA101 and proceeds to the process in step SA102. The CPU 21 then determines the size of a thumbnail image corresponding to the display terminal 30 from which the update request has been acquired in accordance with the update request acquisition order (step SA102). In the embodiment, the CPU 21 increases by a greater amount the size of (enlarges by a greater amount) the thumbnail image corresponding to a display terminal 30 from which the update request has been acquired earlier. The CPU 21 then determines (corrects) the size of the thumbnail image corresponding to the display terminals 30 from which no update request has been acquired (step SA103). In the embodiment, the CPU 21 decreases the size of (reduces) the thumbnail image to be smaller than the size in the list screen image SCL shown in FIG. 7. The CPU 21 then displays the thumbnail image corresponding to the display terminal 30 from which the update request has been acquired in accordance with the size determined in step SA102 (step SA104) and displays the thumbnail images corresponding to the display terminals 30 from which no update request has been acquired in accordance with the size determined in step SA103 (step SA105).

Figure 9A:
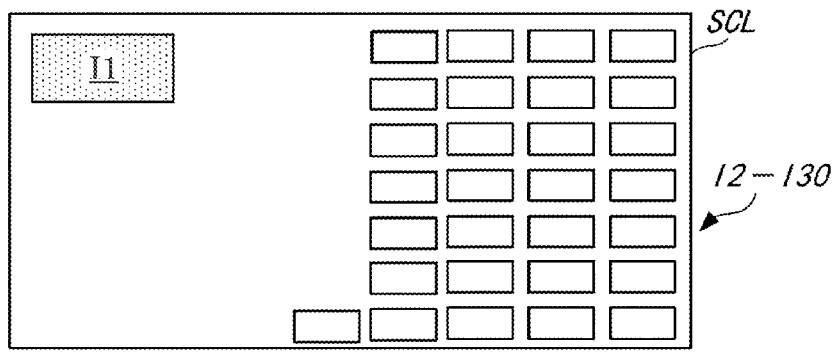
FIGS. 9A to 9D describe display of the list screen image in the case where the enlargement mode is selected in the information processing apparatus according to the first embodiment.

In a case where the update request has been acquired from the display terminal 30-1, the CPU 21 updates the list screen image SCL to that shown in FIG. 9A. In the embodiment, a thumbnail image I1 corresponding to the display terminal 30-1 is enlarged as compared with the thumbnail images shown in FIG. 7 and displayed, as shown in FIG. 9A. The thumbnail images corresponding to the display terminals 30-2 to 30-30 are reduced as compared with those shown in FIG. 7 and displayed.

Figure 9B:
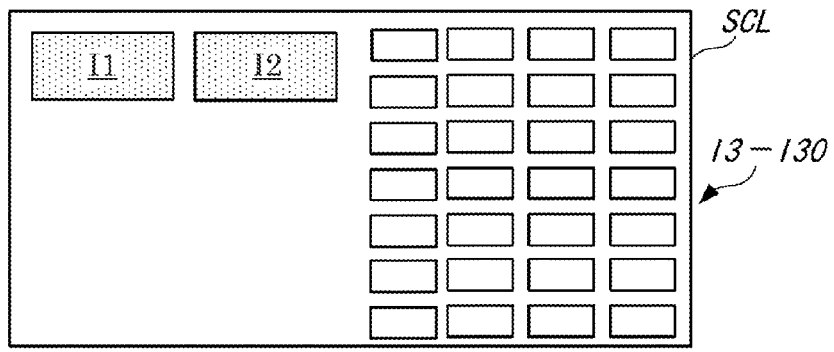

Thereafter, in a case where the update request has been acquired from the display terminal 30-2, which means that J=2, the CPU 21 executes the processes in steps SA101 to SA105 to update the list screen image SCL. In this case, the CPU 21 updates the list screen image SCL to that shown in FIG. 9B. In the update screen image, a thumbnail image I2 corresponding to the display terminal 30-2 is enlarged as compared with the thumbnail image corresponding thereto shown in FIG. 9A and displayed, as shown in FIG. 9B. On the other hand, the thumbnail images corresponding to the display terminals 30-3 to 30-30 are displayed in the same size as the size in FIG. 9A.

When J=3 to 6, the CPU 21 executes the processes in steps SA101 to SA105 to update the list screen image SCL, as in the cases described above.

Thereafter, when the CPU 21 acquires the update request from a display terminal 30 and provides a result of the evaluation "NO" in step SA101, that is, when the CPU 21 determines that the number J of display terminals 30 from which the update request has been acquired is greater than or equal to the specified number K, the CPU 21 proceeds to the process in step SA106. The CPU 21 then determines the size of the thumbnail image corresponding to the display terminal 30 that is K-th in the update request acquisition order to be the size previously determined (step SA106). That is, the CPU 21 determines the size of the thumbnail image corresponding to a display terminal 30 that is K-th or earlier in the update request acquisition order to be the same size as the size determined in step SA102.

The CPU 21 then determines the size of the thumbnail image of a display terminal 30 that is (K+1)-th or later in the update request acquisition order to be a uniform size determined in advance (step SA107). In the embodiment, the CPU 21 determines the size to be smaller than the size of the thumbnail images corresponding to the display terminals 30 that are K-th or earlier in the update request acquisition order but greater than the size of the thumbnail images corresponding to the display terminals 30 from which no update request has been acquired. The CPU 21 then determines the size of the thumbnail image corresponding to each of the display terminals 30 from which no update request has been acquired (step SA108). The process in step SA108 may be the same process in step SA103. The CPU 21 then displays the thumbnail images corresponding to the display terminals 30 from which the update request has been acquired in accordance with the size determined in steps SA107 (step SA104) and displays the thumbnail images corresponding to the display terminals 30 from which no update request has been acquired in accordance with the size determined in step SA108 (step SA105).

Figure 9C:
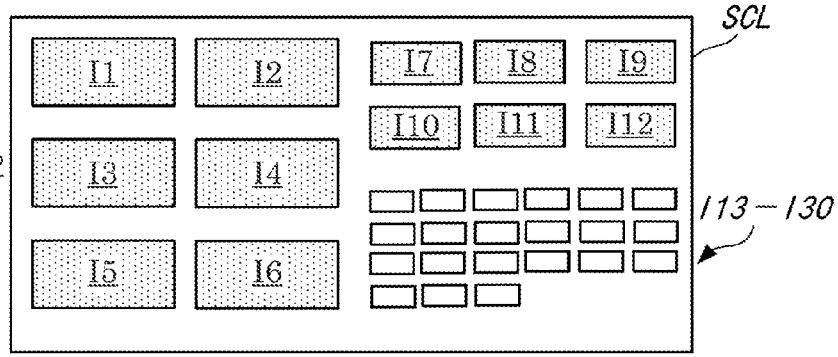

Consider now a case where the information processing apparatus 20 has acquired the update request from each of the display terminals 30-1 to 30-6 and then acquires the update request from each of the display terminals 30-7 to 30-12. In this case, J=12, and the CPU 21 updates the list screen image SCL to that shown in FIG. 9C. Thumbnail images I1 to I6 corresponding to the display terminals 30-1 to 30-6 are enlarged and displayed as shown in FIG. 9C, as in the case described with reference to FIGS. 9A and 9B. Thumbnail images I7 to I12 corresponding to the display terminals 30-7 to 30-12 are displayed in a size smaller than the size of the thumbnail images I1 to I6 but greater than the size of the thumbnail images corresponding to the display terminals 30 from which no update request has been acquired. Thumbnail images I13 to I30 corresponding to the display terminals 30 from which no update request has been acquired are displayed in the same size as the size described with reference to FIGS. 9A and 9B.

Figure 9D:
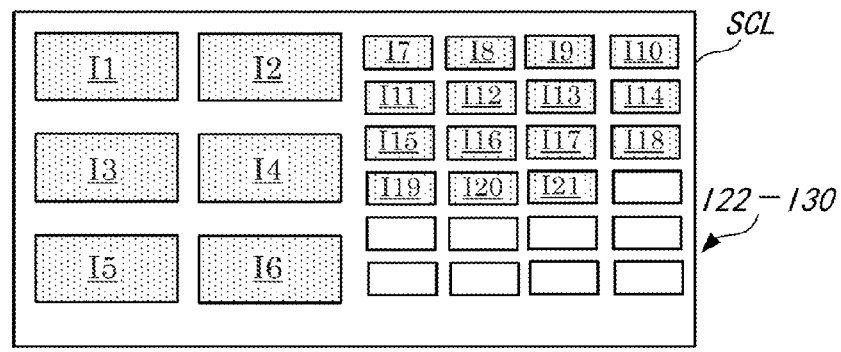

When J=21, the CPU 21 updates the list screen image SCL to that shown in FIG. 9D. Thumbnail images I1 to I6 are displayed in the same size as in FIG. 9C, as shown in FIG. 9D. Thumbnail images I7 to I21 are displayed in the same size as the size of the thumbnail images I22 to I30 corresponding to the display terminals 30 from which no update request has been acquired.

According to the enlargement mode described above, the user UM and the users of the display terminals 30 can visually grasp a display terminal 30 with the display screen image thereof having been updated and the updated display screen image of the display terminal 30.

Deletion Mode

Figure 10:
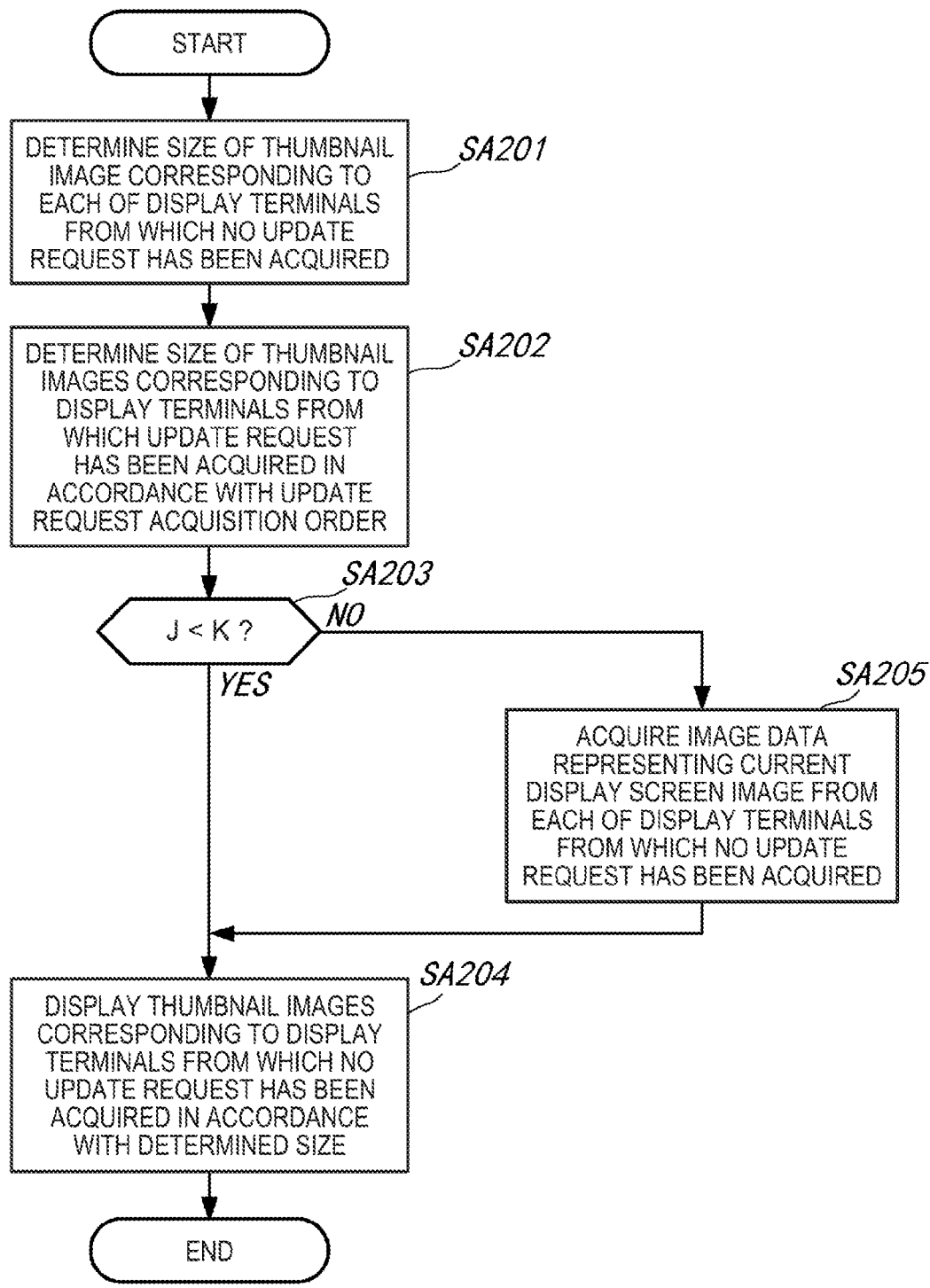
FIG. 10 is a flowchart showing processes carried out when a deletion mode is selected in the information processing apparatus according to the first embodiment.

FIG. 10 is a flowchart showing processes carried out when the deletion mode is selected in the information processing apparatus 20. FIGS. 11A to 11D describe the display of the list screen image in the case where the deletion mode is selected in the information processing apparatus 20.

The CPU 21 first determines the size of the thumbnail image corresponding to each of the display terminals 30 from which no update request has been acquired (step SA201). In the embodiment, the CPU 21 corrects the size of the thumbnail images in such a way that the size is increased (enlarged) as compared with the size in the list screen image SCL shown in FIG. 7. The CPU 21 then determines the size of the thumbnail images corresponding to the display terminals 30 from which the update request has been acquired in accordance with the update request acquisition order (step SA202). In the embodiment, the CPU 21 determines the size of the thumbnail images corresponding to the display terminals 30 from which the update request has been acquired to be "0". The CPU 21 then evaluates whether or not the number of terminals J is smaller than the specified number K determined in advance (step SA203). The specified number K is "21" in the embodiment. When J=1, the CPU 21 provides a result of the evaluation "YES" in step SA203 and proceeds to the process in step SA204. The CPU 21 then displays the thumbnail images corresponding to the display terminals 30 from which no update request has been acquired in accordance with the size determined in step SA202 (step SA204). Since the size of the thumbnail images corresponding to the display terminals 30 from which the update request had been acquired has been set at "0" in the process in step SA202, the CPU 21 deletes the thumbnail images corresponding to these display terminals 30 from the list screen image SCL.

In a case where the CPU 21 has acquired the update request from the display terminal 30-1, the CPU 21 updates the list screen image SCL to that shown in FIG. 11A. Since the size of a thumbnail image I1 corresponding to the display terminal 30-1 is "0", the thumbnail image corresponding to the display terminal 30-1 is deleted from the list screen image SCL, as shown in FIG. 11A. On the other hand, thumbnail images I2 to I30 corresponding to the display terminals 30-2 to 30-30 are displayed in the same size as the size in FIG. 7.

Thereafter, when the CPU 21 acquires the update request from the display terminal 30-2, which means J=2, the processes in steps SA201 to SA204 described above are executed to update the list screen image SCL. In this case, the CPU 21 updates the list screen image SCL to that shown in FIG. 11B. Since the size of the thumbnail image I2 corresponding to the display terminal 30-2 is "0", the thumbnail image corresponding to the display terminal 30-2 is deleted from the list screen image SCL, as shown in FIG. 11B. On the other hand, the thumbnail images I3 to I30 corresponding to the display terminals 30-3 to 30-30 are displayed in the same size as the size in FIG. 7.

When J=3 to 20, the CPU 21 executes the processes in steps SA201 to SA205 described above to update the list screen image SCL, as in the cases described above. When J=12, the CPU 21 updates the list screen image SCL to that shown in FIG. 11C. In this case, the thumbnail images corresponding to the display terminals 30-1 to 30-12 are deleted, as shown in FIG. 11C. On the other hand, the thumbnail images I13 to I30 corresponding to the display terminals 30-13 to 30-30 are displayed in a size greater than the size in FIG. 7. In this case, since the number of thumbnail images displayed on the display unit 26 decreases, the size of each of the thumbnail images increases.

Thereafter, when the CPU 21 acquires the update request from a display terminal 30 and provides a result of the evaluation "NO" in step SA203, that is, when the CPU 21 determines that the number J of display terminals 30 from which the update request has been acquired is greater than or equal to the specified number K, the CPU 21 proceeds to the process in step SA205. The CPU 21 then repeatedly acquires image data representing the current display screen image from each of the display terminals 30 from which no update request has been acquired (step SA205). The CPU 21 acquires the image data, for example, at predetermined intervals in such a way that the thumbnail images representing the current display screen images are displayed, for example, in realtime. The CPU 21 then uses the image data acquired in step SA205 to display thumbnail images corresponding to the display terminals 30 from which no update request has been acquired in accordance with the size determined in step SA202 (step SA204).

When J=21, the CPU 21 updates the list screen image SCL to that shown in FIG. 11D. In this case, the thumbnail images corresponding to the display terminals 30-1 to 30-21 are deleted, as shown in FIG. 11D. On the other hand, the thumbnail images I22 to I30 corresponding to the other display terminals 30-22 to 30-30 are displayed based on the image data acquired in step SA205.

According to the deletion mode described above, the user UM and the users of the display terminals 30 can visually grasp what is displayed on a display terminal 30 the thumbnail image corresponding to which has not been updated. For example, the user UM can grasp who a pupil having trouble in answering a question is and in what point the pupil has trouble.

When the deletion mode is selected and the user UM issues an instruction through operation performed on the operation unit 24, the information processing apparatus 20 may display an image represented by the image data contained in an update request.

Reduction Mode

The procedure of processes carried out when the reduction mode is selected in the information processing apparatus 20 is generally the same as the procedure of the processes carried out when the deletion mode is selected and described with reference to FIG. 10. In the process in step SA201, however, the CPU 21 does not determine the size of the thumbnail images corresponding to the display terminals 30 from which the update request has been acquired to be "0" but determines the size to be a size smaller than the size of the thumbnail images corresponding to the display terminals 30 from which no update request has been acquired but greater than "0". The CPU 21 thus also displays the thumbnail images corresponding to the display terminals 30 from which the update request has been acquired in the list screen image SCL. The CPU 21 displays reduced thumbnail images in accordance with the size determined in step SA201 based on the image data contained in the update request. The process of displaying the thumbnail images is carried out, for example, before or after the process in step SA204.

Figure 12A:
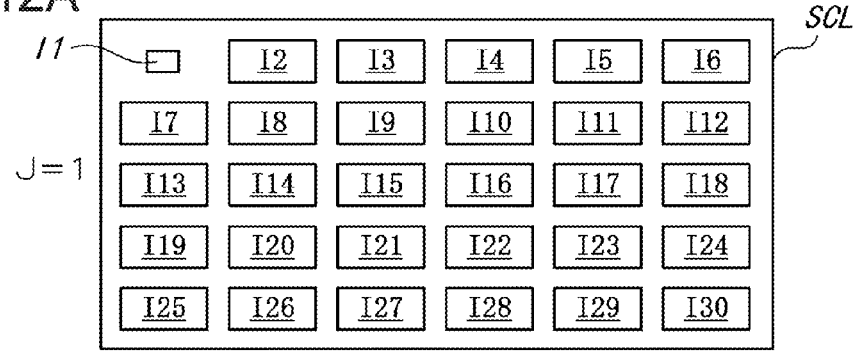
FIGS. 12A to 12D describe the display of the list screen image in a case where a reduction mode is selected in the information processing apparatus according to the first embodiment.
Figure 12B:
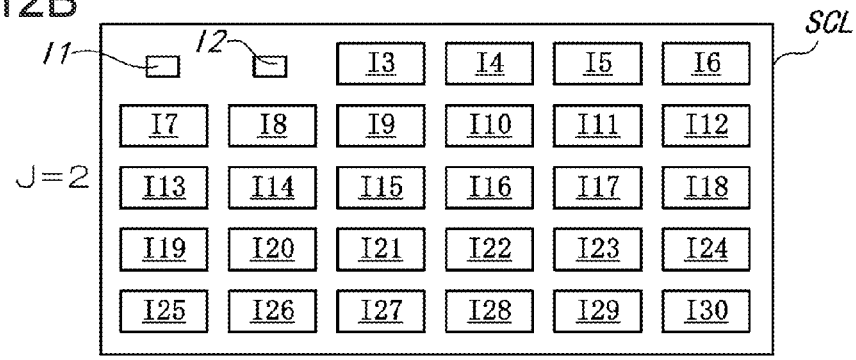
Figure 12C:
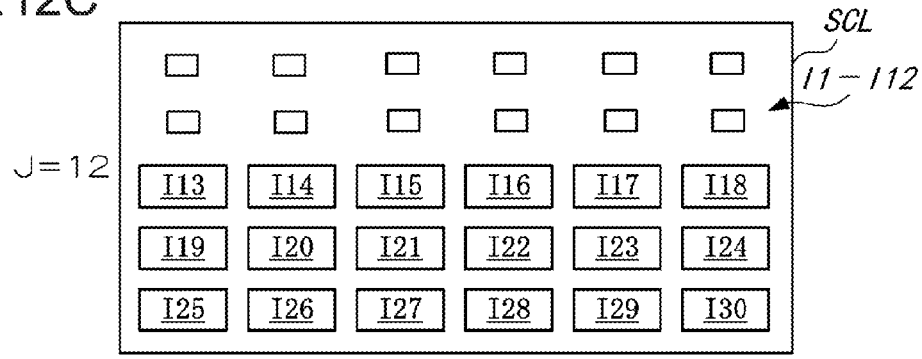
Figure 12D:
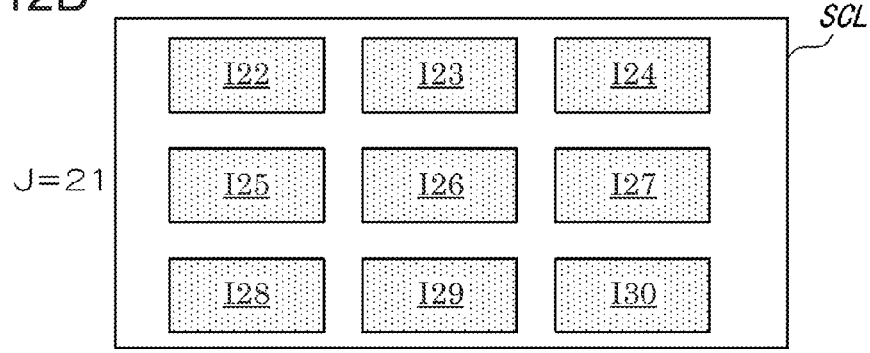

FIGS. 12A to 12D describe the display of the list screen image in the case where the reduction mode is selected in the information processing apparatus 20. When J=1, a thumbnail image I1 corresponding to the display terminal 30-1 is displayed in such a way that the size thereof is smaller than the size of thumbnail images I2 to I30 corresponding to the display terminals 30-2 to 30-30, as shown in FIG. 12A. When J=2, the thumbnail image I2 corresponding to the display terminal 30-2 is also displayed in such a way that the size thereof is smaller than the size of the thumbnail images I3 to I30 corresponding to the display terminals 30-3 to 30-30, as shown in FIG. 12B. Similarly, when J=12, the thumbnail images I1 to I12 corresponding to the display terminals 30-1 to 30-12 are also displayed in such away that the size thereof is smaller than the size of the thumbnail images I13 to I30 corresponding to the display terminals 30-13 to 30-30, as shown in FIG. 12C. When the number J of display terminals 30 from which the update request has been acquired is evaluated to be greater than or equal to the specified number K determined in advance, the action to be performed may be the same as the action performed in the case where the <deletion mode> is selected.

The user UM and the users of the display terminals 30 can therefore visually grasp what is displayed on a display terminal 30 the thumbnail image corresponding to which has not been updated.

According to the information processing apparatus 20 of the first embodiment described above, when a list of images displayed on the display terminals 30-1 to 30-N is displayed, the situation of a change (update) in the image displayed on each of the display terminals 30 can be readily visually grasped in accordance with the set mode.

Second Embodiment

A second embodiment of the invention will next be described. The present embodiment differs from the first embodiment described above in that the size of a thumbnail image is determined in accordance with image data representing the display screen image on a display terminal 30 instead of the update acquisition order. The apparatus provided in the information processing system 1 according to the present embodiment and the hardware configuration of each of the apparatus are the same as those in the first embodiment described above and will therefore not be described.

In the present embodiment, elements having the same reference characters as those in the first embodiment described above function in the same manner as in the first embodiment described above.

Figure 13:
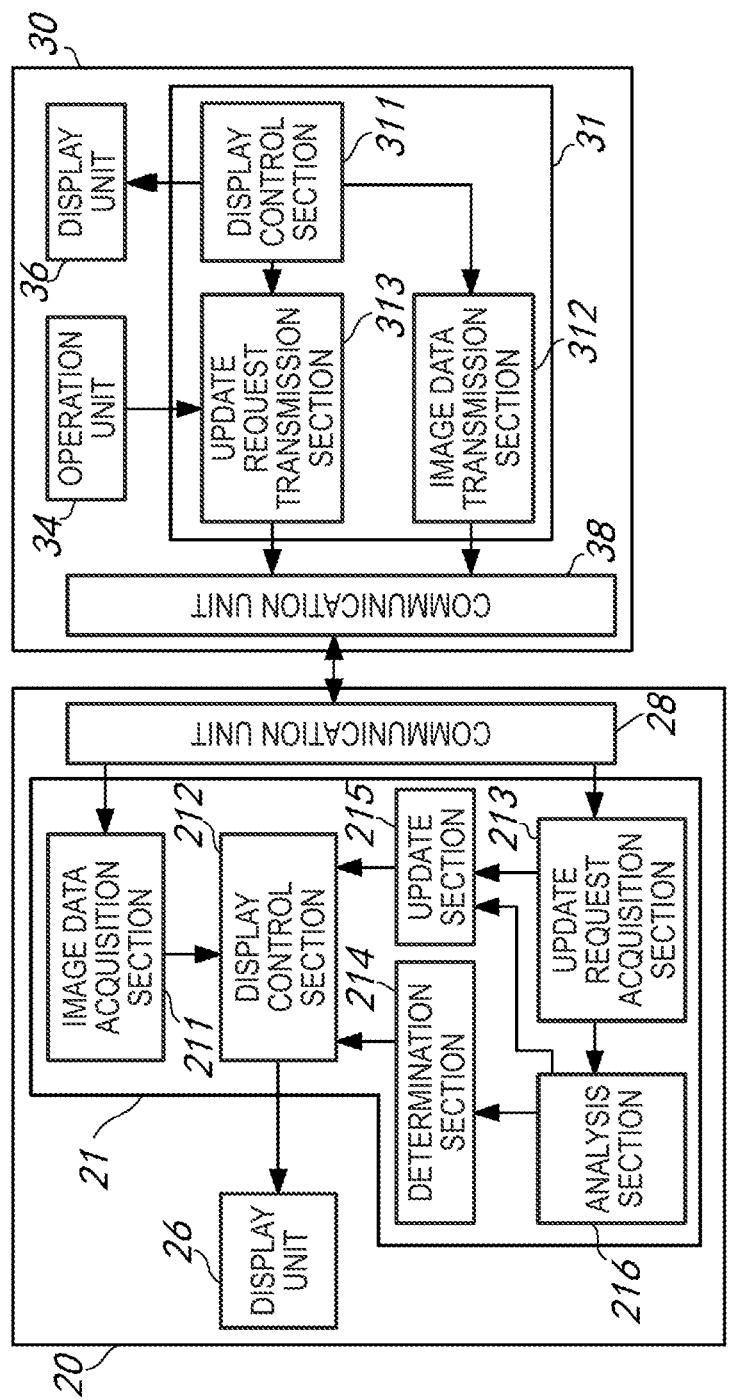
FIG. 13 is a block diagram showing the functional configurations of an information processing apparatus and a display terminal according to a second embodiment of the invention.

FIG. 13 is a block diagram showing the functional configurations of the information processing apparatus 20 and the display terminals 30 in the present embodiment. The CPU 21 of the information processing apparatus 20 executes the display application AP1 to achieve the functions of the image data acquisition section 211, the display control section 212, the update request acquisition section 213, the determination section 214, the update section 215, and an analysis section 216.

The image data acquisition section 211 acquires image data representing the display screen image of each of the display terminals 30-1 to 30-N (first image data) from the display terminal 30 via the communication unit 28 (first acquisition section).

The display control section 212 displays a list screen image showing a list of the display screen images on the display terminals 30-1 to 30-N on the display unit 26 based on the image data acquired by the image data acquisition section 211.

After the list screen image is displayed, the update request acquisition section 213 acquires, from one display terminal 30 of the display terminals 30-1 to 30-N via the communication unit 28, image data representing the display screen image on the display terminal 30 (second image data) (second acquisition section). The image data is contained in the update request transmitted from the display terminal 30 in the present embodiment.

The analysis section 216 analyzes the image data acquired by the update request acquisition section 213. The analysis section 216 carries out, for example, a process of recognizing a character contained in the display screen image (that is, OCR process). The determination section 214 determines the size of each thumbnail image in the list screen image in accordance with a result of the analysis performed by the analysis section 216. The update section 216 updates the list in accordance with the sizes determined by the determination section 214.

The CPU 31 of each of the display terminals 30 executes the display application AP2 to achieve the functions corresponding to the display control section 311, the image data transmission section 312 (first transmission section), and the update request transmission section 313 (second transmission section). These functions are the same as those in the first embodiment described above and will therefore not be described.

Action in the present embodiment will next be described. The following description of the action will be made with reference to a case where the information processing system 1 includes 30 display terminals 30 or display terminals 30-1 to 30-30 (that is, N=30).

Overall Action

Figure 14:
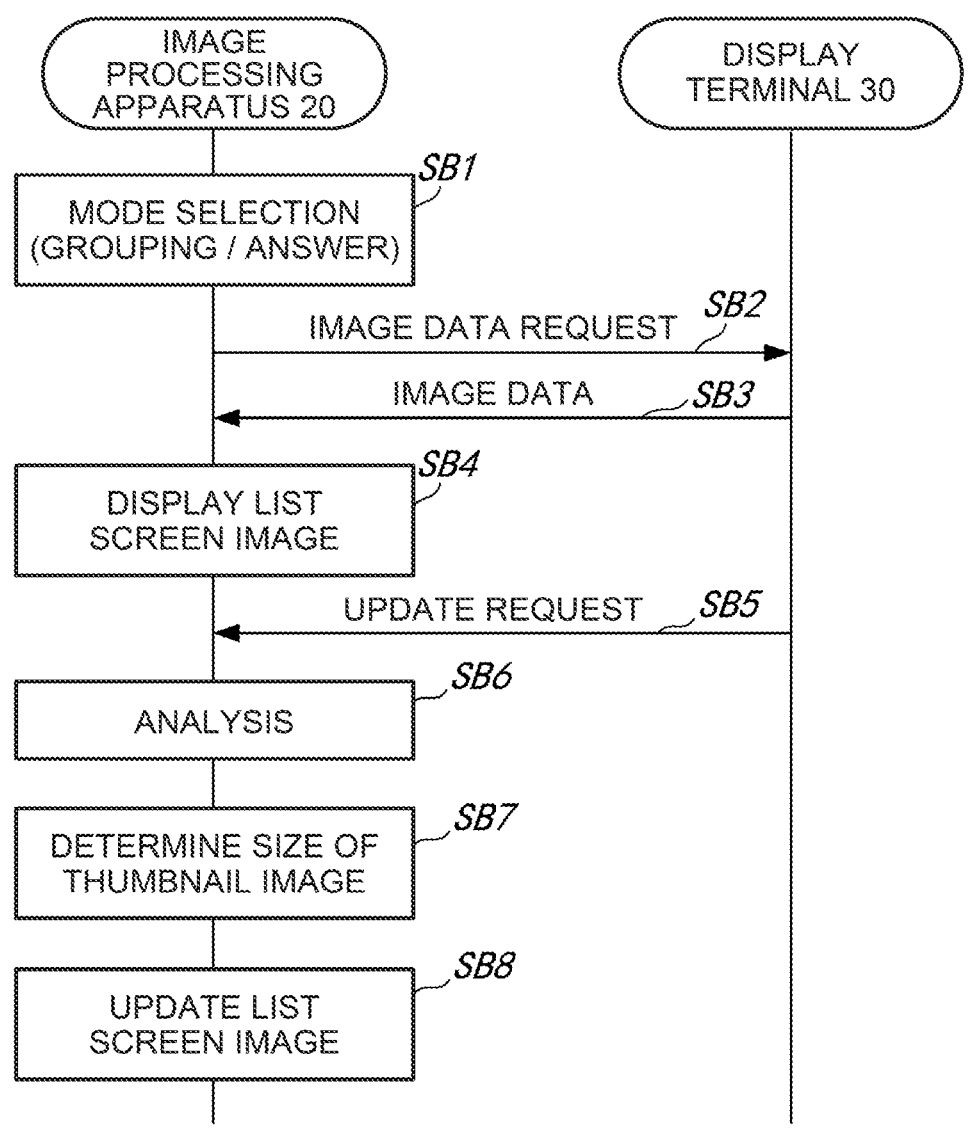
FIG. 14 is a sequence chart showing an overall process procedure in an information processing system according to the second embodiment.

FIG. 14 is a sequence chart showing an overall process procedure in the information processing system 1.

The CPU 21 of the information processing apparatus 20 first selects a list screen image display mode (step SB1). In the present embodiment, the mode is formed of two modes, a "grouping mode" and an "answer mode," and each of the modes will be described later in detail. The CPU 21 then transmits an image data request that requests transmission of image data representing the current display screen to each of the display terminals 30-1 to 30-30 via the communication unit 28 (step SB2). Having received the image data request via the communication unit 38, the CPU 31 of each of the display terminals 30, in response to the request, transmits image data representing the current display screen image on the display unit 36 to the information processing apparatus 20 (step SB3). Having received the image data from each of the display terminals 30-1 to 30-30 via the communication unit 28, the CPU 21 of the information processing apparatus 20 displays a list screen image on the display unit 26 based on the acquired image data (step SB4).

When the CPU 31 of any of the display terminals 30 is notified that the display screen image has been updated in response to user's operation performed on the operation unit 34, the CPU 31 transmits the update request to the information processing apparatus 20 via the communication unit 38 (step SB5). The update request contains image data representing the current display screen, for example, an image having been updated by the user. Having acquired (received) the update request transmitted from the display terminal 30 via the communication unit 28, the CPU 21 of the information processing apparatus 20 analyzes the image data acquired from the display terminal 30 (step SB6) and determines the size of the thumbnail image corresponding to the display terminal 30 in accordance with a result of the analysis (step SB7). The CPU 21 then updates the list screen image in accordance with the determined size (step SB8).

A description will next be made of processes characteristic of the determination of the size of each thumbnail image and the update of the list screen image performed by the information processing apparatus 20 for each of the modes.

Grouping Mode

Figure 15:
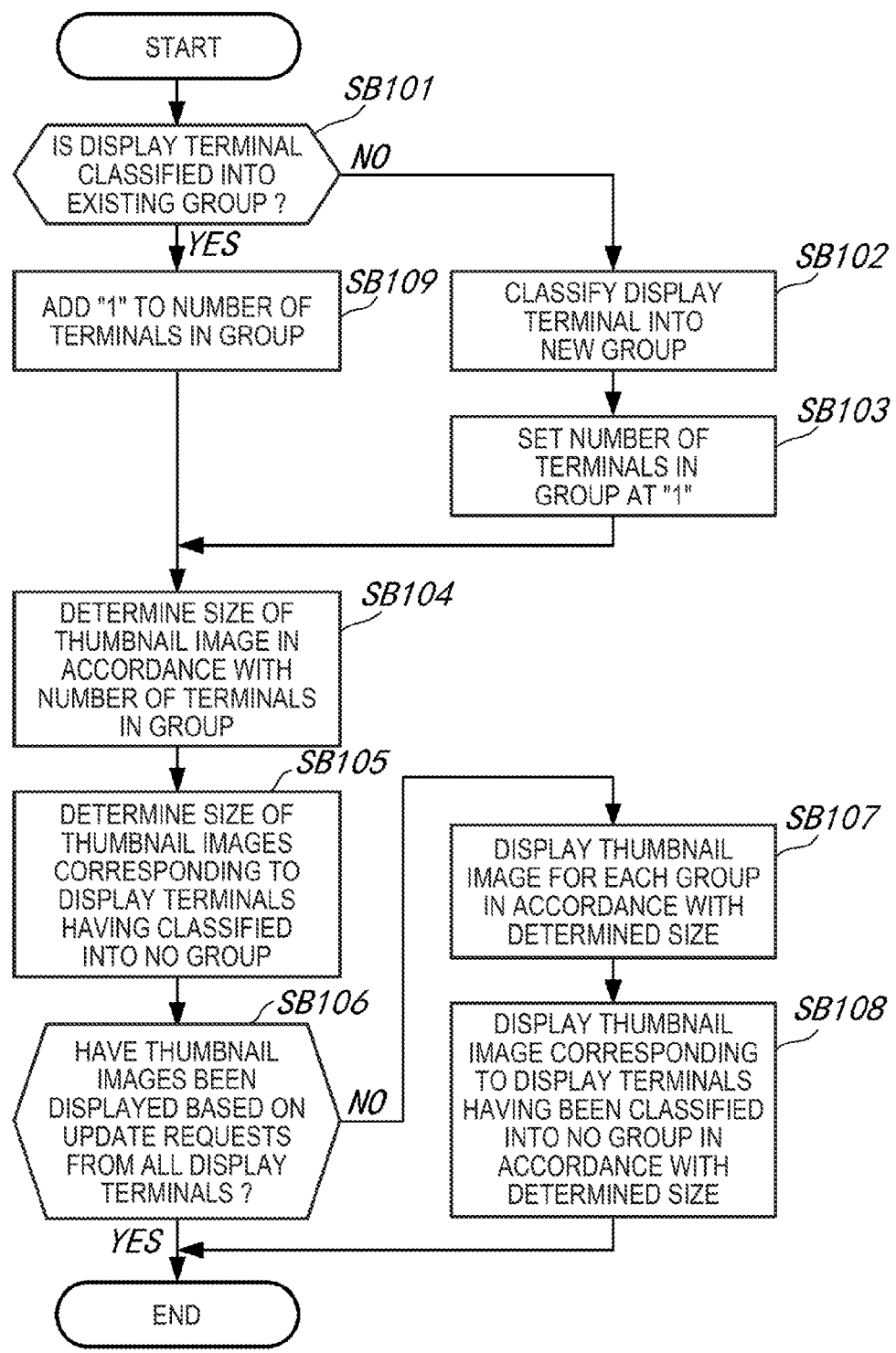
FIG. 15 is a flowchart showing processes carried out when a grouping mode is selected in the information processing apparatus according to the second embodiment.

FIG. 15 is a flowchart showing processes carried out when the grouping mode is selected in the information processing apparatus 20. FIGS. 16A to 16D describe the display of the list screen image in the case where the grouping mode is selected in the information processing apparatus 20.

The CPU 21 first evaluates, based on a result of the analysis of image data contained in an update request, whether the display terminal 30 that is the source of the transmitted image data is classified into an existing group (step SB101). In the embodiment, it is assumed that two or more display terminals 30 showing the same answer for a question sentence (same character that image object means in the embodiment) are classified into the same group. Let now J be the number of display terminals 30 having been classified into a group, and when J=1, no group has been yet set. In this case, the CPU 21 provides a result of the evaluation "NO" in step SB101 and proceeds to the process in step SB102. The CPU 21 then classifies the display terminal 30 into a new group (step SB102). The CPU 21 then set the number of display terminals 30 having been classified into the group at "1" (step SB103). In the embodiment, the CPU 21 classifies the display terminal 30-1 into a group Gr1.

The CPU 21 then determines the size of a thumbnail image for each group in accordance with the number of terminals in the group (step SB104). In the embodiment, the CPU 21 increases by a greater amount the size of a thumbnail image for a group having a greater number of terminals. The CPU 21 then determines the size of thumbnail images corresponding to the display terminals 30 which are not classified into any group (step SB105). In the embodiment, the CPU 21 determined the size in such a way that the thumbnail images corresponding to all the display terminals 30 fall within the list screen image SCL. The CPU 21 then evaluates whether the thumbnail images have been displayed in the list screen image based on the update requests from all the display terminals 30 (step SB106). When the CPU provides a result of the evaluation "NO" in step SB106, the CPU 21 displays a thumbnail image for each group (that is, representative image) in accordance with the size determined in step SB104 (step SB107). The CPU 21 then displays thumbnail images corresponding to the display terminals 30 having been classified into no group in accordance with the size determined in step SB105 (step SB 108).

When J=1 and the display terminal 30-1 is classified into the group Gr1, the CPU 21 displays the list screen image SCL shown in FIG. 16A. The CPU 21 displays a thumbnail image IGr1, which is a representative image corresponding to the group Gr1 and expressed in a thumbnail, in a size greater than the size of thumbnail images I2 to I30 corresponding to display terminals 30-2 to 30-30 having been classified into no group, as shown in FIG. 16A. In the embodiment, the thumbnail image IGr1 represents the display screen image of the display terminal 30-1. The CPU 21, for example, displays the representative image based on image data acquired from a first display terminal 30 in each group but may instead determine the representative image by using any other method.

Thereafter, when J=2 and the CPU 21 classifies the display terminal 30-2 into a group Gr2, the CPU 21 also executes the processes in steps SB101 to SB108 described above to display the list screen image SCL shown in in FIG. 16B. FIG. 16B shows a list screen image SCL in a case where the user of the display terminal 30-2 gives an answer different from the answer given by the user of the display terminal 30-1. The CPU 21 displays a thumbnail image IGr2, which is the representative image for the group Gr2, in a size greater than the size of the thumbnail images I3 to I30 corresponding to the display terminals 30-3 to 30-30 from which no update request has been acquired in addition to the thumbnail image IGr1, which is the representative image for the group Gr1, as shown in FIG. 16B. The thumbnail image IGr2 is displayed based on the update request from the display terminal 30-2. In the embodiment, since the numbers of terminals in the groups Gr1 and Gr2 are both "1", the thumbnail images IGr1 and IGr2 have the same size.

When the CPU 21 has determined in step SB101, based on a result of the analysis of image data contained in an update request, that the display terminal 30 that is the source of the transmitted update request is classified into an existing group (YES in step SB101), the CPU 21 proceeds to the process in step SB109. When a display terminal 30 has shown the same answer before, the CPU 21 provides a result of the evaluation "YES" in step SB101. The CPU 21 then classifies the display terminal 30 to be classified into the exiting group and adds "1" to the current number of terminals in the group (step SB109). The CPU 21 subsequently executes the processes in step SB104 to SB108 to update the list screen image SCL.

When J=12 and the CPU 21 classifies the display terminals 30 into five groups, the groups Gr1 to Gr5, the CPU 21 displays, for example, the list screen image SCL shown in FIG. 16C. The CPU 21 displays the thumbnail images IGr1 to IGr5, which are representative images for the groups Gr1 to Gr5, in sizes greater than the size of the thumbnail images corresponding to the display terminals 30 having been classified into no group, as shown in FIG. 16C. Further, the CPU 21 increases by a greater amount the size of the thumbnail image for a group having a greater number of terminals.

Thereafter, when J=21 and the CPU 21 classifies the display terminals 30 into six groups, the groups Gr1 to Gr6, the CPU 21 displays, for example, the list screen image SCL shown in FIG. 16D. The CPU 21 displays the thumbnail images IGr1 to IGr6, which are representative images for the groups Gr1 to Gr6, in sizes greater than the size of the thumbnail images corresponding to the display terminals 30 having been classified into no group, as shown in FIG. 16D.

Further, the CPU 21 increases by a greater amount the size of the thumbnail image for a group having a greater number of terminals.

Thereafter, when the CPU 21 displays the thumbnail images in the list screen image SCL based on the update requests from all the display terminals 30, the CPU 21 provides a result of the evaluation "YES" in step SB106 and terminates the process procedure.

In the grouping mode, when thumbnail images corresponding to the display terminals 30 from which the update request has been acquired are displayed, the information processing apparatus 20 displays a single thumbnail image on a group basis and increases by a greater amount the size of the thumbnail image for a group having a greater number of terminals. As a result, a thumbnail image corresponding to display terminals showing a greater number of duplicated answers is more visible, whereby the situation of answers given by the users of the display terminals 30-1 to 30-N is readily visually grasped.

The information processing apparatus 20 may not increase and instead decrease by a greater amount the size of a thumbnail image for a group having a greater number of terminals. As a result, a thumbnail image corresponding to display terminals showing a greater number of duplicated answers is less visible, whereas a thumbnail image corresponding to display terminals showing a smaller number of answers is more visible. Further, the information processing apparatus 20 may delete a thumbnail image corresponding to a group having a large number of terminals or a group having a small number of terminals from the list screen image.

Answer Mode

Figure 17:
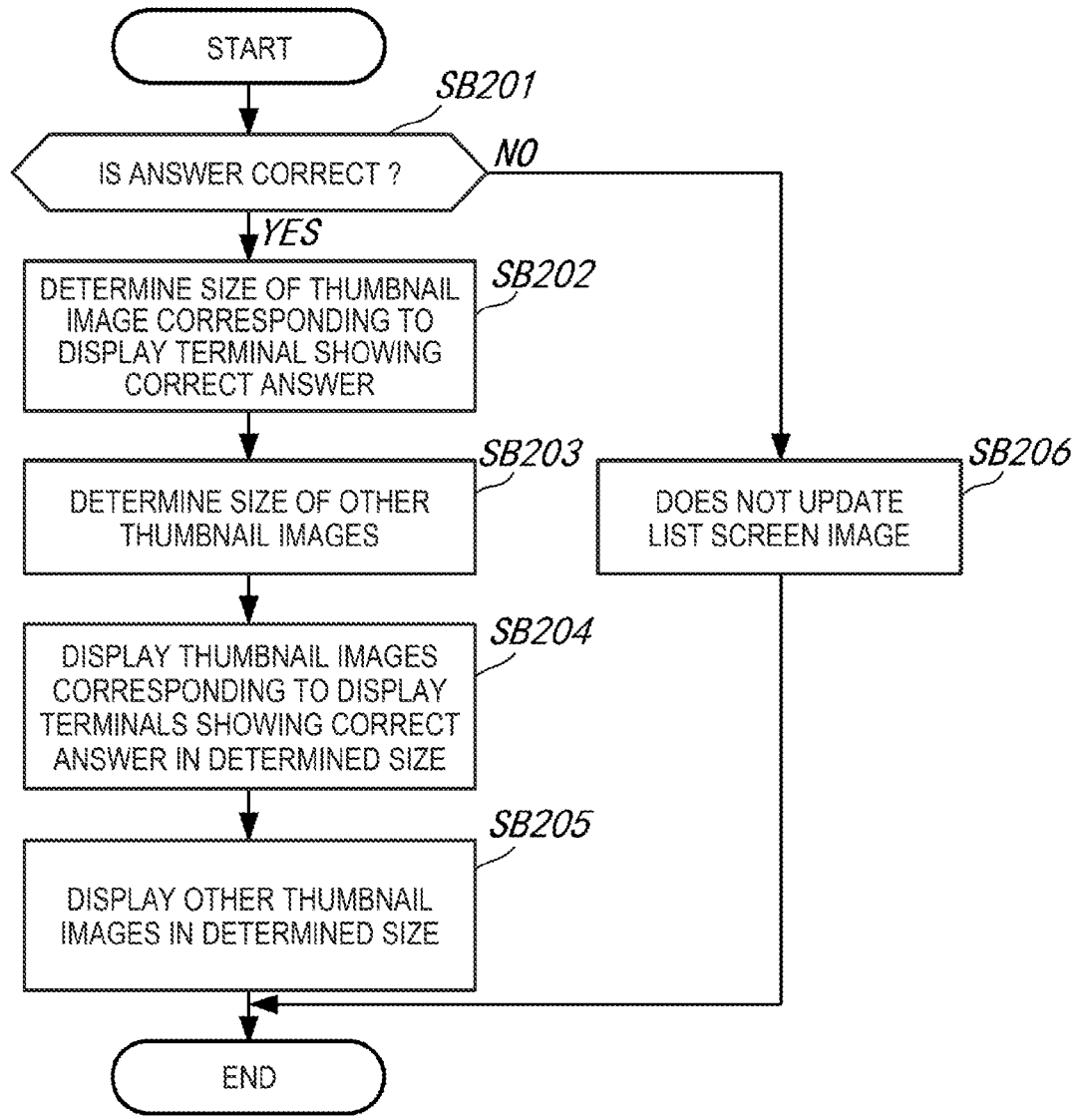
FIG. 17 is a flowchart showing the procedure of processes carried out in an answer mode in the information processing apparatus according to the second embodiment.

FIG. 17 is a flowchart showing processes carried out when the answer mode is selected in the information processing apparatus 20. The CPU 21 analyzes image data contained in an update request to evaluate whether an answer contained in an image represented by the image data is correct based on a result of the analysis (step SB201). Data representing a correct answer is stored, for example, in the storage unit 27 in advance. When the CPU 21 determines that the answer is correct (YES in step SB201), the CPU 21 determines the size of the thumbnail image corresponding to the display terminal 30 showing the correct answer (step SB202). In the embodiment, the CPU 21 changes the size of the thumbnail image to be smaller (reduces the thumbnail image). Instead, the CPU 21 may delete the thumbnail image when it has determined that the answer is correct or changes the size of the thumbnail image to be larger (enlarges the thumbnail image).

The CPU 21 then determines the size of the other thumbnail images in such a way that the thumbnail images corresponding to all the display terminals 30 fall within the list screen image SCL (step SB203). The other thumbnail images are thumbnail images corresponding to the display terminals 30 from which no update request has been acquired and thumbnail images corresponding to the display terminals 30 showing incorrect answers. The CPU 21, for example, does not change the sizes of the other thumbnail images.

The CPU 21 then displays the thumbnail images corresponding to the display terminals 30 showing the correct answer in the size determined in step SB202 (step SB204) and displays the other thumbnail images in the size determined in step SB203 (step SB205).

On the other hand, when the CPU 21 has determined in step SB201 that the answer is incorrect (NO in step SB201), the CPU 21 does not update the list screen image (step SB206). The situation of the answers shown in display terminals 30-1 to 30-30 is thus readily visually grasped.

In the information processing apparatus 20 according to the second embodiment described above, when a list of the images displayed on the display terminals 30-1 to 30-N are displayed, the situation of a change in the image displayed on each of the display terminals 30 can be readily visually grasped, as in the embodiment described above.

The relationships described above between a result of the analysis of image data contained in an update request and the size of a thumbnail image are presented by way of example, and other relationships may be employed.

Variations

The invention can be implemented in a form different from the embodiments described above. Further, the following variations may be combined with each other as appropriate.

The information processing apparatus 20 may perform the action of each of the modes described in the above first and second embodiments.

The display terminal 30 may transmit the update request in the first embodiment described above without any operation performed on the operation unit 34. The display terminal 30 may transmit the update request, for example, in a predetermined elapsed period after user's drawing operation.

The information processing apparatus 20 may perform analysis other than character recognition in the analysis of image data contained in the update request in the second embodiment described above.

Further, part of the configuration and action described in each of the above embodiments may be omitted, and the order of the processes described in the each of above embodiments may be changed. For example, in the first embodiment described above, when the deletion mode or the reduction mode is selected, an update request may not contain image data representing the display screen image on the display terminal 30. Further, the information processing apparatus 20 may display an updated thumbnail with no list screen image displayed.

The list screen image may not necessarily display thumbnail image corresponding to all display terminals. In this case, the information processing apparatus 20 may allow a user to check a thumbnail image that corresponds to a display terminal but is not displayed through screen scrolling or screen switching.

The function of the information processing apparatus 20 may instead be achieved by the projector 10. In this case, the projector 10 functions as the information processing apparatus in each of the embodiments of the invention. In this case, the CPU 11 of the projector 10 achieves the function of the CPU 21 described with reference to FIGS. 4 and 13.

Part of the configuration or the action of the information processing system 1 according to each of the embodiments described above may be omitted. For example, the projector 10 may be omitted or the projector 10 can be replaced with an FPD (flat panel display) or any other display apparatus. Further, the configuration or the action relating to part of each of the modes described above may be omitted. Moreover, the arrangements and sizes of thumbnail images and the configuration of the list screen image are presented only by way of example. Each of the information processing apparatus 20 and the display terminals 30 only needs to be an apparatus that displays an image and may be a personal computer, a PDA (personal digital assistant), a smartphone, and other apparatus.

In each of the embodiments described above, the functions achieved by the CPU 21 of the information processing apparatus 20 and the CPU 31 of each of the display terminals 30 can be achieved by a combination of a plurality of programs or by cooperation between a plurality of hardware resources. Further, when the functions of the CPUs 21 and 31 are achieved by using programs, the programs can be stored on and provided in the form of a magnetic recording medium (such as magnetic tape and magnetic disk (HDD (hard disk drive), FD (flexible disk))), an optical recording medium (such as optical disk), a magneto-optical recording medium, a semiconductor memory, or any other computer readable recording medium or may be distributed over a network. Further, the invention can be considered as an information processing method.

What is claimed is:

1. An information processing apparatus that communicates with a plurality of terminal devices each of which displays an image, the information processing apparatus comprising:
   at least one processor configured to:
      acquire image data from each of the plurality of terminal devices, the image data representing an image displayed on the terminal device;
      display, based on the acquired image data, a list of thumbnail images representing the images displayed on the plurality of terminal devices;
      acquire a first signal from a first terminal device and a second signal from a second terminal device of the plurality of terminal devices, the first signal and the second signal notifying that a first image displayed on the first terminal device and a second image displayed on the second terminal device have been updated, respectively;
      determine, in accordance with an acquisition order in which the first signal and the second signal are acquired from the first terminal device and the second terminal device among the plurality of terminal devices, a first size of a first thumbnail image corresponding to the first image displayed on the first terminal device when the first thumbnail image is displayed in the list and a second size of a second thumbnail image corresponding to the second image displayed on the second terminal device when the second thumbnail image is displayed in the list; and
      update the list in accordance with the determined first size and second size,
   wherein the first size and the second size are different from each other.

2. The information processing apparatus according to claim 1,
   wherein the at least one processor is configured to increase the first size of the first thumbnail image by a greater amount than the second size of the second thumbnail image when the first signal is acquired earlier in the acquisition order than the second signal.

3. The information processing apparatus according to claim 1,
   wherein the at least one processor is configured to delete the first thumbnail image from the list when the first signal is acquired earlier in the acquisition order than the second signal.

4. The information processing apparatus according to claim 3,
   wherein when the first signal is not acquired, the at least one processor is configured to repeatedly acquire the image data representing the first image displayed on the first terminal device and display the first thumbnail image represented by the acquired image data in the list.

5. The information processing apparatus according to claim 1,
   wherein the at least one processor is configured to decrease the first size of the first thumbnail image by a greater amount than the second size of the second thumbnail image when the first signal is acquired earlier in the acquisition order than the second signal.

6. The information processing apparatus according to claim 1,
   wherein after the list is displayed, the at least one processor acquires from the first terminal device of the plurality of terminal devices the first signal notifying that the first image displayed on the first terminal device has been updated.

7. An information processing apparatus that communicates with a plurality of terminal devices each of which displays an image, the information processing apparatus comprising:
   at least one processor configured to:
      acquire first image data from each of the plurality of terminal devices, the first image data representing an image displayed on the terminal device;
      display, based on the acquired first image data, a list of thumbnail images representing the images displayed on the plurality of terminal devices;
      acquire second image data from each of the plurality of terminal devices, the second image data representing handwritten image objects superimposed over each of the images displayed on each terminal device of the plurality of terminal devices;
      analyze the second image data acquired from each of the plurality of terminal devices and determines, based on the second image data, whether each image object of each of the plurality of terminal devices matches a predetermined pattern;
      determine, in accordance with the analysis a first size of first thumbnail images corresponding to first terminal devices having image objects matching the predetermined pattern when the first thumbnail images are displayed in the list and a second size of second thumbnail images corresponding to second terminal devices having image objects that do not match the predetermined pattern; and
      update the list in accordance with the determined first size and second size,
   wherein the first size and the second size are different from each other.

8. The information processing apparatus according to claim 7, wherein:
   the at least one processor is configured to classify the first terminal devices into a first group and classify the second terminal devices into a second group in accordance with the analysis,
   the at least one processor is configured to determine the first size and the second size in accordance with a number of terminal devices classified into each group, and
   the at least one processor is configured to display the first thumbnail images and the second thumbnail images for the first group and the second group, respectively.

9. The information processing apparatus according to claim 7, wherein after the list is displayed, the at least one processor acquires from one terminal device of the plurality of terminal devices the second image data.

10. An information processing method comprising:
acquiring image data from each of a plurality of terminal devices each of which displays an image, the image data representing an image displayed on the terminal device;
displaying, based on the acquired image data, a list of thumbnail images representing the images displayed on the plurality of terminal devices;
acquiring a first signal from a first terminal device and a second signal from a second terminal device of the plurality of terminal devices, the first signal and the second signal notifying that a first image displayed on the first terminal device and a second image displayed on the second terminal device have been updated, respectively;
determining, in accordance with an acquisition order in which the first signal and the second signal are acquired from the first terminal device and the second terminal device among the plurality of terminal devices, a first size of a first thumbnail image corresponding to the first image displayed on the first terminal device when the first thumbnail image is displayed in the list and a second size of a second thumbnail image corresponding to the second image displayed on the second terminal device when the second thumbnail image is displayed in the list; and
updating the list in accordance with the determined first size and second size,
wherein the first size and the second size are different from each other.

11. An information processing method comprising:
acquiring first image data from each of a plurality of terminal devices each of which displays an image, the first image data representing an image displayed on the terminal device;
displaying, based on the acquired first image data, a list of thumbnail images representing the images displayed on the plurality of terminal devices;
acquiring second image data from each of the plurality of terminal devices, the second image data representing written image objects superimposed over each of the images displayed on each terminal device of the plurality of terminal devices;
analyzing the second image data acquired from each of the plurality of terminal devices and determining, based on the second image data, whether each image object of each of the plurality of terminal devices matches a predetermined pattern;
determining, in accordance with the analysis, a first size of first thumbnail images corresponding to first terminal devices having image objects matching the predetermined pattern when the first thumbnail images are displayed in the list and a second size of second thumbnail images corresponding to second terminal devices having image objects that do not match the predetermined pattern; and
updating the list in accordance with the determined first size and second size,
wherein the first size and the second size are different from each other.

12. An information processing system comprising:
a plurality of terminal devices each of which displays an image; and
an information processing apparatus that communicates with the plurality of terminal devices, the information processing apparatus includes:
at least one processor configured to:
acquire image data from each of the plurality of terminal devices, the image data representing an image displayed on the terminal device,
display, based on the acquired image data, a list of thumbnail images representing the images displayed on the plurality of terminal devices,
acquire a first signal from a first terminal device and a second signal from a second terminal device of the plurality of terminal devices, the first signal and the second signal notifying that a first image displayed on the first terminal device and a second image displayed on the second terminal device have been updated, respectively,
determine, in accordance with an acquisition order in which the first signal and the second signal are acquired from the first terminal device and the second terminal device among the plurality of terminal devices, a first size of a first thumbnail image corresponding to the first image displayed on the first terminal device when the first thumbnail image is displayed in the list and a second size of a second thumbnail image corresponding to the second image displayed on the second terminal device when the second thumbnail image is displayed in the list, and
update the list in accordance with the determined first size and second size,
wherein the first size and the second size are different from each other, and each of the plurality of terminal devices includes
at least one processor configured to:
transmit the image data representing the image displayed on the terminal device to the information processing apparatus, and
transmit a third signal notifying that the image displayed on the terminal device has been updated to the information processing apparatus.

13. An information processing system comprising:
a plurality of terminal devices each of which displays an image; and
an information processing apparatus that communicates with the plurality of terminal devices,
the information processing apparatus includes
at least one processor configured to:
acquire first image data from each of the plurality of terminal devices, the first image data representing an image displayed on the terminal device,
display, based on the acquired first image data, a list of thumbnail images representing the images displayed on the plurality of terminal devices,
acquire second image data from each of the plurality of terminal devices, the second image data representing written image objects superimposed over each of the images displayed on each terminal device of the plurality of terminal devices,
analyze the second image data acquired from each of the plurality of terminal devices and determines, based on the second image data, whether each image object of each of the plurality of terminal devices matches a predetermined pattern,
determine, in accordance with the analysis, a first size of first thumbnail images corresponding to first terminal devices having image objects matching the predetermined pattern when the first thumbnail images are displayed in the list and a second size of second thumbnail images corresponding to second terminal devices having image objects that do not match the predetermined pattern, and update the list in accordance with the determined first size and second size, wherein the first size and the second size are different from each other, and each of the plurality of terminal devices includes at least one processor configured to:
 transmit the first image data to the information processing apparatus, and
 transmit the second image data to the information processing apparatus after the list is displayed.

14. A non-transitory computer readable recording medium storing a program, the program causes a computer to perform:

acquiring image data from each of a plurality of terminal devices each of which displays an image, the image data representing an image displayed on the terminal device;

displaying, based on the acquired image data, a list of thumbnail images representing the images displayed on the plurality of terminal devices;

acquiring a first signal from a first terminal device and a second signal from a second terminal device of the plurality of terminal devices, the first signal and the second signal notifying that a first image displayed on the first terminal device and a second image displayed on the second terminal device have been updated, respectively;

determining, in accordance with an acquisition order in which the first signal and the second signal are acquired from the first terminal device and the second terminal device among the plurality of terminal devices, a first size of a first thumbnail image corresponding to the first image displayed on the first terminal device when the first thumbnail image is displayed in the list and a second size of a second thumbnail image corresponding to the second image displayed on the second terminal device when the second thumbnail image is displayed in the list; and updating the list in accordance with the determined first size and second size, wherein the first size and the second size are different from each other.

15. A non-transitory computer readable recording medium storing a program, the program causes a computer to perform:

acquiring first image data from each of a plurality of terminal devices each of which displays an image, the first image data representing an image displayed on the terminal device;

displaying, based on the acquired first image data, a list of thumbnail images representing the images displayed on the plurality of terminal devices;

acquiring second image data from each of the plurality of terminal devices, the second image data representing written image objects superimposed over each of the images displayed on each terminal device of the plurality of terminal devices;

analyzing the second image data acquired from each of the plurality of terminal devices and determining, based on the second image data, whether each image object of each of the plurality of terminal devices matches a predetermined pattern;

determining, in accordance with the analysis, a first size of first thumbnail images corresponding to first terminal devices having image objects matching the predetermined pattern when the first thumbnail images are displayed in the list and a second size of second thumbnail images corresponding to second terminal devices having image objects that do not match the predetermined pattern; and updating the list in accordance with the determined first size and second size, wherein the first size and the second size are different from each other.

\* \* \* \* \*